(12) United States Patent
Couleaud et al.

(10) Patent No.: US 12,556,773 B2
(45) Date of Patent: Feb. 17, 2026

(54) SYSTEMS AND METHODS FOR DELIVERING MEDIA ASSETS WITH POST-CREDITS CONTENT

(71) Applicant: Adeia Guides Inc., San Jose, CA (US)

(72) Inventors: Jean-Yves Couleaud, Mission Viejo, CA (US); Reda Harb, Tampa, FL (US); Ning Xu, Irvine, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/375,316

(22) Filed: Sep. 29, 2023

(65) Prior Publication Data
US 2025/0113083 A1    Apr. 3, 2025

(51) Int. Cl.
H04N 21/482    (2011.01)
H04N 21/462    (2011.01)

(52) U.S. Cl.
CPC ......... *H04N 21/482* (2013.01); *H04N 21/462* (2013.01)

(58) Field of Classification Search
CPC ........... H04N 21/462; H04N 21/47205; H04N 21/482
USPC ........................................................ 725/61
See application file for complete search history.

(56) References Cited

U.S. PATENT DOCUMENTS

| | | |
|---|---|---|
| 2007/0079329 A1 | 4/2007 | Aoyagi |
| 2015/0170325 A1 | 6/2015 | Abecassis et al. |
| 2022/0400301 A1* | 12/2022 | Aher ............... G06F 40/284 |
| 2023/0156275 A1 | 5/2023 | Aher et al. |

OTHER PUBLICATIONS

Google Play "Should I Wait?—Movie Credits", (https://play.google.com/store/apps/details?id=tgo1014.shouldiwait) (downloaded Oct. 3, 2023)(2 pages).
IMDB "Internet Movie Database",(https://www.imdb.com/)(downloaded Oct. 3, 2023)(2 pages).
Plex "Credits Detection", (https://support.plex.tv/articles/credits-detection/)(downloaded Oct. 3, 2023)(4pages).
Wikipedia, "List of films with post", (https://en.wikipedia.org/wiki/List_of_films_with_post-)(downloaded Oct. 3, 2023)(1 page).

* cited by examiner

Primary Examiner — Dominic D Saltarelli
(74) Attorney, Agent, or Firm — HG LAW LLP

(57) ABSTRACT

Systems and methods are provided herein for playing post-credits content in media assets by overriding play-next logic in OTT applications and presenting options for post-credits content in broadcast applications. A media application may be pre-configured to automatically "play-next" a queued media asset after the beginning of credits of a media asset start playing. However, if the media application detects post-credits content (e.g., trailer), it may display a user interface prompt to present options that may include continuing to play the credits, or to skip the credits entirely and go straight to the post-credits content. Upon receiving the user interface selection for one of the options, the media application modifies the playing of the media asset to override the configuration to automatically play-next, and instead modifies the logic to play the selected one of two options as described above.

15 Claims, 17 Drawing Sheets

FIG. 11

SYSTEMS AND METHODS FOR DELIVERING MEDIA ASSETS WITH POST-CREDITS CONTENT

BACKGROUND

This disclosure is related to systems and methods for user interfaces of media assets in streaming and broadcast mediums.

SUMMARY

More and more media assets (e.g., movies and television shows) have content such as featurettes or teasers for consumption after the credits in the media asset have been provided. Some media assets may even have multiple scenes intertwined with the credits.

In some embodiments, such post-credits content is not important to the story (e.g., for example, bloopers or funny events that happened during filming). In some embodiments, post-credits content may reveal a new take on an ending (e.g., the film "Hypnotic" included a dramatic-twist ending). In some approaches, post-credits content may include scenes from a related media asset (e.g., in relation to a sequel or a future installment in a franchise). In such examples, missing the post-credits content may mean not enjoying the full extent of the media asset as intended by the director and writers.

Post-credits content is becoming more and more prevalent in movies and television shows, both from over-the-top ("OTT") streaming services, and from broadcast providers (including emulated broadcasts delivered via OTT protocols). As importance of post-credits content to the media assert (e.g., movie or television show) increases, systems, methods and user interfaces for handing post-credits content become increasingly relevant.

In some approaches, a media application that provides a media asset for consumption (e.g., via an OTT service) may be configured to queue up the next media asset when the current media asset plays to credits (e.g., five seconds after the credits begin). In this way, the credits are skipped, and a new media asset is played immediately or substantially immediately upon the credits beginning. For example, the queued media asset may be the subsequent episode in a television series, or a media asset that is recommended for a particular user profile. In these approaches, the media application is not providing the post-credits content at all. Moreover, the user may not even know there is post-credits content available as the play-next content is played without the full runtime of the previous media asset that may have contained post-credits content. Thus, the user interface fails to provide the full feature set of the media asset in a delivery logic that is harmonious with the viewing experience so as not to introduce spoilers or present information too early, detracting from the viewing experience. In some other approaches, the media application does not queue any media and plays media assets from start to finish without any modification. This approach is also problematic as the viewing experience is compromised when the credits are played fully within a modification of play to skip the credits. In another approach, in a broadcast scenario, a movie is played for its full runtime including credits. This often results in a user switching away to another program in the interim upon the credits beginning, as the user does not know there is a post-credits scene coming up subsequent to the credits.

To overcome these deficiencies, systems, methods, and user interfaces are provided herein for playing post-credits content in media assets by overriding play-next logic. In one embodiment, this solution is generally applicable for over-the-top streaming platforms. A media application may be pre-configured to automatically "play-next" a queued media asset after the beginning of credits of a media asset start playing. However, if the media application detects a post-credits content (e.g., trailer of a potential sequel to the media asset currently being viewed), it may display a user interface prompt to present options that may include continuing to play the credits, or to skip the credits entirely and skip straight to the post-credits content. Upon receiving the user interface selection for one of the options, the media application modifies the playing of the media asset to override the configuration to automatically play-next, and instead adjusts the logic to play the selected one of two options as mentioned above (e.g., play credits and post-credits content, or skip directly to post-credits content). In this way, the user interface provides for a more engaging experience by providing options only at the beginning of the credits content, so as not to cause spoilers of the film during the scenes of the media asset, but ensuring that there is a notification that a post-credits scene is available for viewing. Secondly, the presently disclosed solution also provides for a multiplicity in functionality to either skip directly to the post-credits content, play the entire run time of the media asset including credits, or play-next depending on user interface responses, media asset metadata matching, and/or user profile behavior.

In some examples, the media application may be pre-configured to automatically play-next a queued media asset after the beginning of credits of a media asset start playing just as before. However, if there is detection of post-credits content (e.g., trailer of a potential sequel to the media asset currently being viewed), and if there is metadata of the post-credits content that matches content of a user profile, then the media application may override the pre-configuration to play-next, and may instead adjust the logic to play a selected one of two options, as mentioned above (e.g., play credits and post-credits content, or skip directly to post-credits content). In this scenario, there is no user interface prompt, but rather the media application selects an option based on the metadata of the post-credits content and the content of a user profile. In some embodiments, the media application may determine post-credits content selection behavior either of a specific user profile or a sample of a plurality of user profiles. Based on the behavior, the media application may select one of the two options, as mentioned above.

In some examples, the present application provides for the media application to generate the user interface prompts, including a thumbnail having user profile metadata matching the metadata of the post-credits content. For example, if the post-credits content includes an actor that matches the metadata of a user profile showing a favorable opinion of the actor, the media application may generate a thumbnail featuring the actor in the user interface prompt.

In some variants, the present application may, prior to playing of media assets, receive a user interface selection for a preferred configuration to modify the automatically play-next queued media asset. In some instances, the options include selection of automatically continuing to play the credits and the subsequent post-credits content, automatically skipping the credits content to play the post-credits content immediately, digitally storing (e.g., recording or downloading) the post-credits content for later viewing, or sending the post-credits content to a second device for viewing. When this user interface selection is received, the media application may reset the pre-configuration to the received selection.

Accordingly, the present disclosure provides for an improved navigational user interface that may result in higher viewer engagement through provision of a multiplicity in functionality to either skip directly to the post-credits content, play the entire run time of the media asset including credits and post-credits content, or play-next and skip the post-credits content depending on user interface responses, media asset metadata matching, and/or user profile behavior.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 11 shows an illustrative scenario of a UI generating a prompt for post-credits content in a broadcast-based media application, in accordance with some embodiments of this disclosure.

DETAILED DESCRIPTION

Figure 1:
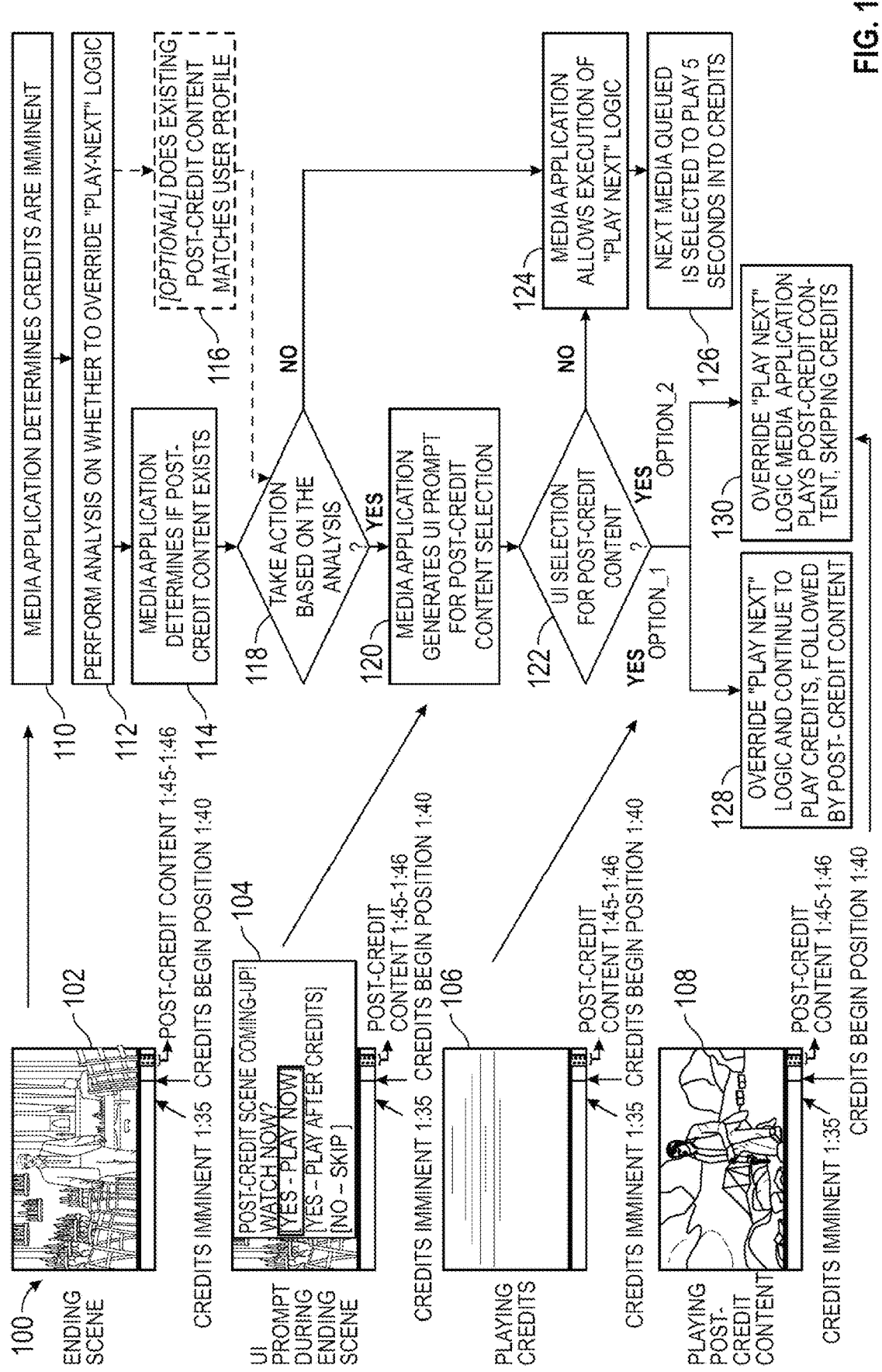
FIG. 1 shows an illustrative scenario in which a UI overrides a play-next logic for an over-the-top streaming media application, in accordance with some embodiments of this disclosure.

FIG. 1 shows an illustrative scenario 100 in which a UI overrides a play-next logic for an over-the-top streaming media application, in accordance with some embodiments of this disclosure. The media application may be playing the media asset "John Wick 4" on a user equipment. At 110, as the media asset proceeds to play, the media application may determine whether the credits are imminent within the media asset. In some embodiments, the media application may determine whether credits are imminent within the media asset by analyzing the metadata of the media asset and checking timestamp data to determine whether the current play timestamp is approaching the metadata corresponding to the credits section of the runtime. In some embodiments, the media application determines whether credits are imminent based on computer vision techniques that analyze current frames of the media asset to characterize the type of scene that is being played. In such techniques, various image recognition techniques (optionally implemented alongside machine learning techniques) can be used to determine whether a credit scene is being played. In some embodiments, the media application determines whether credits are imminent based on computer vision techniques that analyze buffered frames of the media asset to characterize the type of scene. In this way, the frames are yet to be displayed to the user equipment, but rather are being pre-processed. This approach implements the same image recognition and/or machine learning techniques mentioned above. At 102, as shown in the timeline, the media application determines that the credits are imminent (at 110) at timestamp 1 hr 35 mins, where credits begin at 1 hr 40 mins, and post-credits content begins at 1 hr 45 mins and ends at 1 hr 46 mins. In some embodiments, in place of determining whether credits are imminent, the media application may instead determine whether a scene of significance has been viewed (via analysis of metadata and/or computer vision techniques). An example of a scene of significance may be a main actor dying, a main plot objective being fulfilled, or similar large milestones. The media application may further determine a scene of significance via metadata from a user profile, and or a plurality of user profiles. For example, if there is digital information (e.g., social media posts) on a specific scene within a media asset that is talked about in volume, this may be a scene of significance. In these scenarios, even if credits are not imminent but a scene of significance has been generated for display, the media application may continue the logic shown below of determining inclusion of post-credits content, generating for display a prompt at the beginning of the credits content, and in response to receiving a selection from the prompt, performing the selection.

In some embodiments, the media application may play a media asset on a user equipment. The media asset may be configured by the media application to automatically play a next media asset after beginning of the credits content of the media asset. This "play-next" logic may be a default logic by the media application. Continuing with FIG. 1, at 112, the media application performs analysis on whether to override the "play-next" logic of the media application. In some embodiments, this entails the subsequent steps in FIG. 1.

The media application may determine whether the media asset includes post-credits content. Post-credits content may be any content that is presented after the credits begin in a media asset. For example, post-credits content may include, but is not limited to, trailers, bloopers, commentary, additional scenes, alternate endings, related or unrelated music videos, or teasers for one or more other media assets related or unrelated to the current media asset. In some embodiments, the media application determines whether the media asset includes post-credits content by analyzing the metadata of the media asset and checking timestamp data to determine whether the current play timestamp is approaching the metadata corresponding to the post-credits content section of the runtime. In some embodiments, the media application determines whether post-credits content is included based on computer vision techniques that analyze current frames of the media asset to characterize the type of scene that is being played. In such techniques, various image recognition techniques (optionally implemented alongside machine learning techniques) can be used to determine whether post-credits content is being played. In some embodiments, the media application determines whether post-credits content is included based on computer vision techniques that analyze buffered frames of the media asset to characterize the type of scene that is being played. In this way, the frames are yet to be displayed to the user equipment, but rather are being pre-processed. This approach implements the same image recognition and/or machine learning techniques mentioned above. Returning to FIG. 1, at 114, the media application determines whether post-credits content exists using the techniques described above.

At 116, the media application optionally determines whether existing post-credits content metadata matches user profile information. User profile information may include metadata about the user profile based on device usage, browsing history, preferences, surveys completed by the user, etc. The post-credits content metadata may be pre-populated within the media asset. In some embodiments, the post-credits content metadata is determined by the media application using computer vision techniques as described above. In some embodiments, the post-credits content metadata is retrieved from a third-party server.

The media application may, in response to determining that the media asset comprises post-credits content, generate for display a prompt at the beginning of the credits content. The prompt may include a first option to continue playing the credits content and a second option to skip to the post-credits content. At 118, the media application determines whether to take action based on the analysis. In this example, because there is a post-credits scene in John Wick 4, the media application proceeds to take action. At 120, the media application generates a UI prompt for the post-credits content as shown in 104. The UI prompt provides the following message: "Post-credits scene coming up! Watch now?" followed by three options: (1) YES—Play now, (2) YES—Play after credits, and (3) NO—Skip. If the media application determines not to take action, it would process the next step to maintain the "play-next" logic at 124 and subsequently 126, where the next media asset is queued and selected to play five seconds into the credits.

The media application may receive a user interface selection of one of the first option or the second option. At 122, the media application determines which option is selected. In one scenario 128, the media application receives the option to play credits (shown in 106) and subsequently play the post-credits content in John Wick 4 (shown in 108) by overriding the play-next logic. In another scenario 130, the media application receives the option to play the post-credits content in John Wick 4 (shown in 108) immediately, and skips the credits by overriding the play-next logic. Thus, based on the user interface selection of one of the first option or the second option, the media application modifies the playing of the media asset to override the configuration to automatically play the next media asset, or alternatively modifies the playing of the media asset to be based on the selection of one of the first option or the second option.

Figure 2:
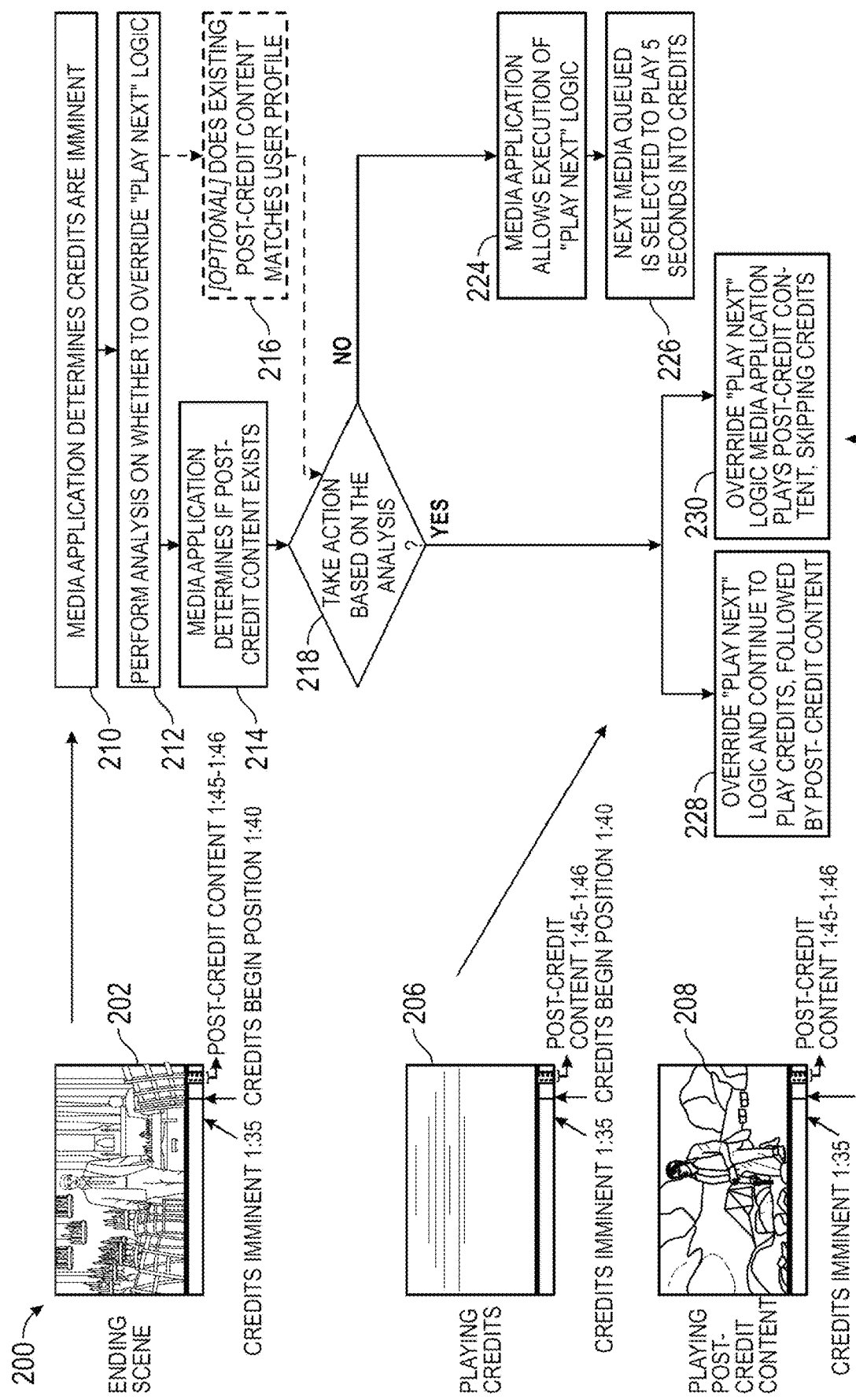
FIG. 2 shows another illustrative scenario in which a UI overrides a play-next logic for an over-the-top streaming media application, in accordance with some embodiments of this disclosure.

FIG. 2 shows another illustrative scenario 200 in which a UI overrides a play-next logic for an over-the-top streaming media application, in accordance with some embodiments of this disclosure. The media application may be playing the media asset John Wick 4 on a user equipment. As the media asset proceeds to play, the media application may determine whether the credits are imminent within the media asset as described above. At 202, as shown in the timeline, the media application determines that the credits are imminent (at 210) at timestamp 1 hr 35 mins, where credits begin at 1 hr 40 mins, and post-credits content begins at 1 hr 45 mins and ends at 1 hr 46 mins.

The media asset may be configured by the media application to automatically play a next media asset after beginning of credits content of the media asset. At 212, the media application performs analysis on whether to override the "play-next" logic of the media application. In some embodiments, this entails the subsequent steps in FIG. 2.

The media application may determine whether the media asset includes post-credits content using the techniques as previously described above. In such techniques, various image recognition techniques (optionally implemented alongside machine learning techniques) can be used to determine whether post-credits content is being played. Returning to FIG. 2, at 214, the media application determines whether post-credits content exists using the techniques described above.

At 216, the media application optionally determines whether existing post-credits content metadata matches user profile information. User profile information may include metadata about the user profile based on device usage, browsing history, preferences, surveys completed by the user, etc. The post-credits content metadata may be pre-populated within the media asset. In some embodiments, the post-credits content metadata is determined by the media application using computer vision techniques as described above. In some embodiments, the post-credits content metadata is retrieved from a third-party server.

The media application may, in response to determining that the media asset comprises post-credits content, modify the playing of the media asset to override the configuration to automatically play the next media asset by performing one of: automatically continuing to play the credits content and the post-credits content, or automatically skipping the credits content to play the post-credits content. At 218, the media application determines whether to take action based on the analysis. In this example, because there is a post-credits scene in John Wick 4, the media application proceeds to take action. In a positive determination, the media application proceeds to option 1 (228) to override "play next" logic and continue to play the credits, followed by the post-credits content (shown in 206), or the media application proceeds to option 2 (230) to override "play next" logic and play the post-credits content of John Wick 4 by skipping the credits (shown in 208). If the media application determines not to take action, it would process the next step to maintain the "play-next" logic at 224 and subsequently 226, where the next media asset is queued and selected to play five seconds into the credits.

Figure 3:
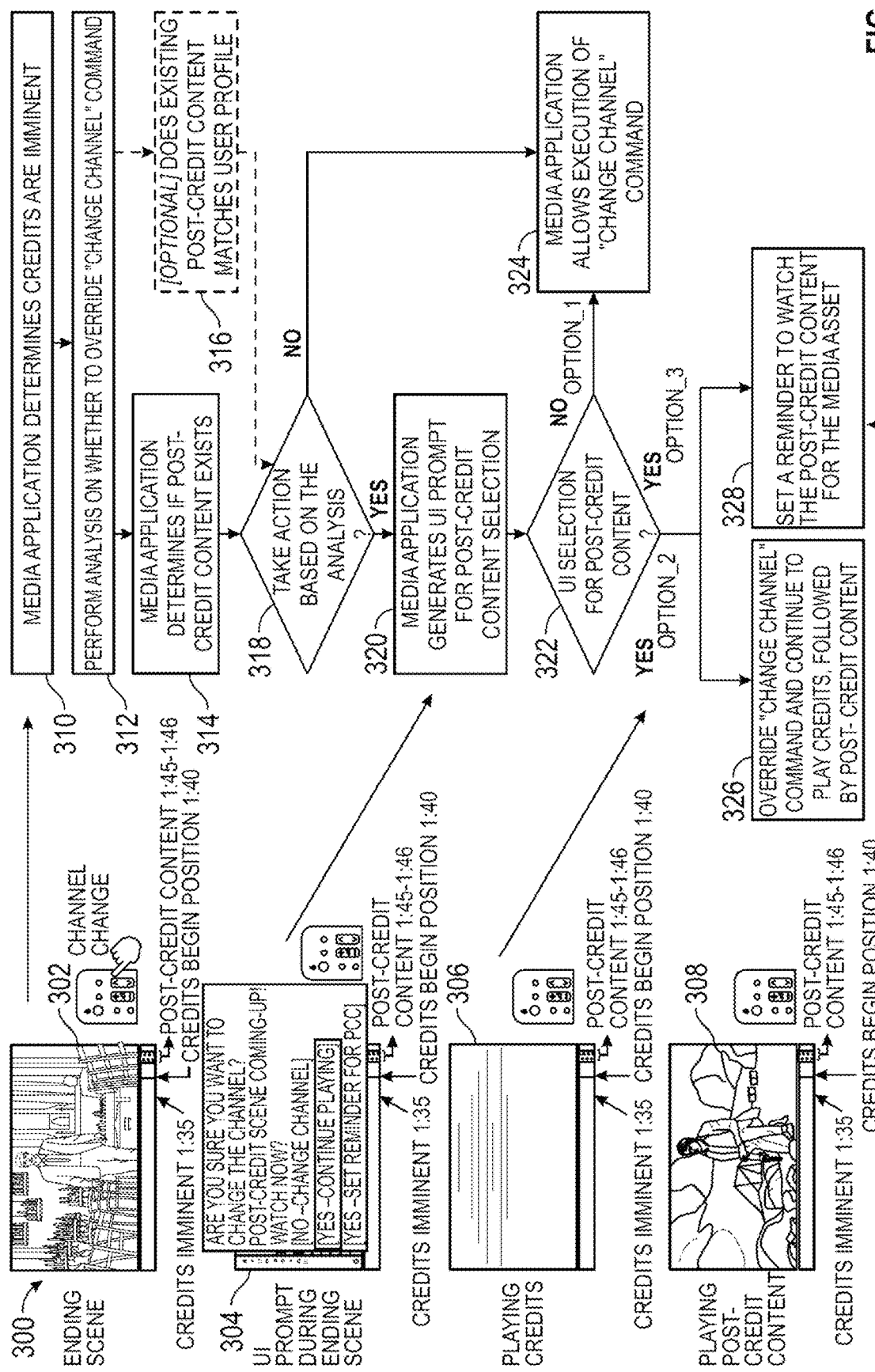
FIG. 3 shows an illustrative scenario in which a UI provides viewing options for post-credits content in a broadcast-based media application, in accordance with some embodiments of this disclosure.

FIG. 3 shows an illustrative scenario 300 in which a UI provides viewing options for post-credits content in a broadcast-based media application, in accordance with some embodiments of this disclosure. The media application may be adapted for broadcast media, which includes emulated broadcast performed via OTT protocols. For example, the media application is playing a media asset, John Wick 4, on a user equipment. The media asset may include credits content and post-credits content. As the media asset proceeds to play, the media application may determine whether the credits are imminent within the media asset as described previously. At 302, as shown in the timeline, the media application determines that the credits are imminent (at 310) at timestamp 1 hr 35 mins, where credits begin at 1 hr 40 mins, and post-credits content begins at 1 hr 45 mins and ends at 1 hr 46 mins. The media application receives a request to change the channel for playing John Wick 4 from a user equipment (e.g., the UI receives an instruction from a remote control user equipment to change channel).

The media application, in response to receiving a request to change source for the playing, determines whether the request was received during the credits content and before the post-credits content. In this example, the request to change channel during John Wick 4 was done after the credits begin but before the post-credits content, as shown in 302.

The media application may determine whether the media asset includes post-credits content using the techniques as previously described above. In such techniques, various image recognition techniques (optionally implemented alongside machine learning techniques) can be used to determine whether post-credits content is being played in a real-time broadcast environment. Returning to FIG. 3, at 314, the media application determines whether post-credits content exists using the techniques described above.

At 316, the media application optionally determines whether existing post-credits content metadata matches user profile information. User profile information may include metadata about the user profile based on device usage, browsing history, preferences, surveys completed by the user, etc. The post-credits content metadata may be prepopulated within the media asset. In some embodiments, the post-credits content metadata is determined by the media application using computer vision techniques as described above. In some embodiments, the post-credits content metadata is retrieved from a third-party server. At 318, the media application takes action based on this analysis.

The media application may, in response to determining that the request (e.g., to change channel) was received during the credits content and before the post-credits content, override the request to change the source and generate for display a prompt comprising a first option to confirm the change, a second option to keep playing the media asset, and a third option to set a reminder to watch the post-credits content for the media asset. At 304, the media application generates for display a UI prompt (320) reciting "Are you sure you want to change the channel? Post-credits scene coming up!" This is followed by three options: "[NO—Change channel], [YES—Continue playing], [YES—Set reminder for post-credits content]."

The media application may, in response to receiving a user interface selection of one of the first option, the second option, or the third option, perform an action specified by the user interface selection. At 322, the media application determines whether a selection was made for options 2 or 3 regarding post-credits content. If not, and the first option to confirm the change was selected, the media application executes the change channel command (324). If the second option was selected (326) to keep playing the media asset, the media application continues to play credits, followed by post-credits content (shown in 308), or the media application proceeds to third option (328) to set a reminder to watch the post-credits content of John Wick 4. For example, the media application may generate the reminder upon the post-credits content commencing after the user has changed channels. In some embodiments, if the second option is selected to keep playing the media asset, the media application may digitally store (e.g., download or record) the post-credits content and allow for viewing at the convenience of the end user. In this way, the media application presents an option for the live broadcast post-credits content to be captured for later viewing.

Figure 4:
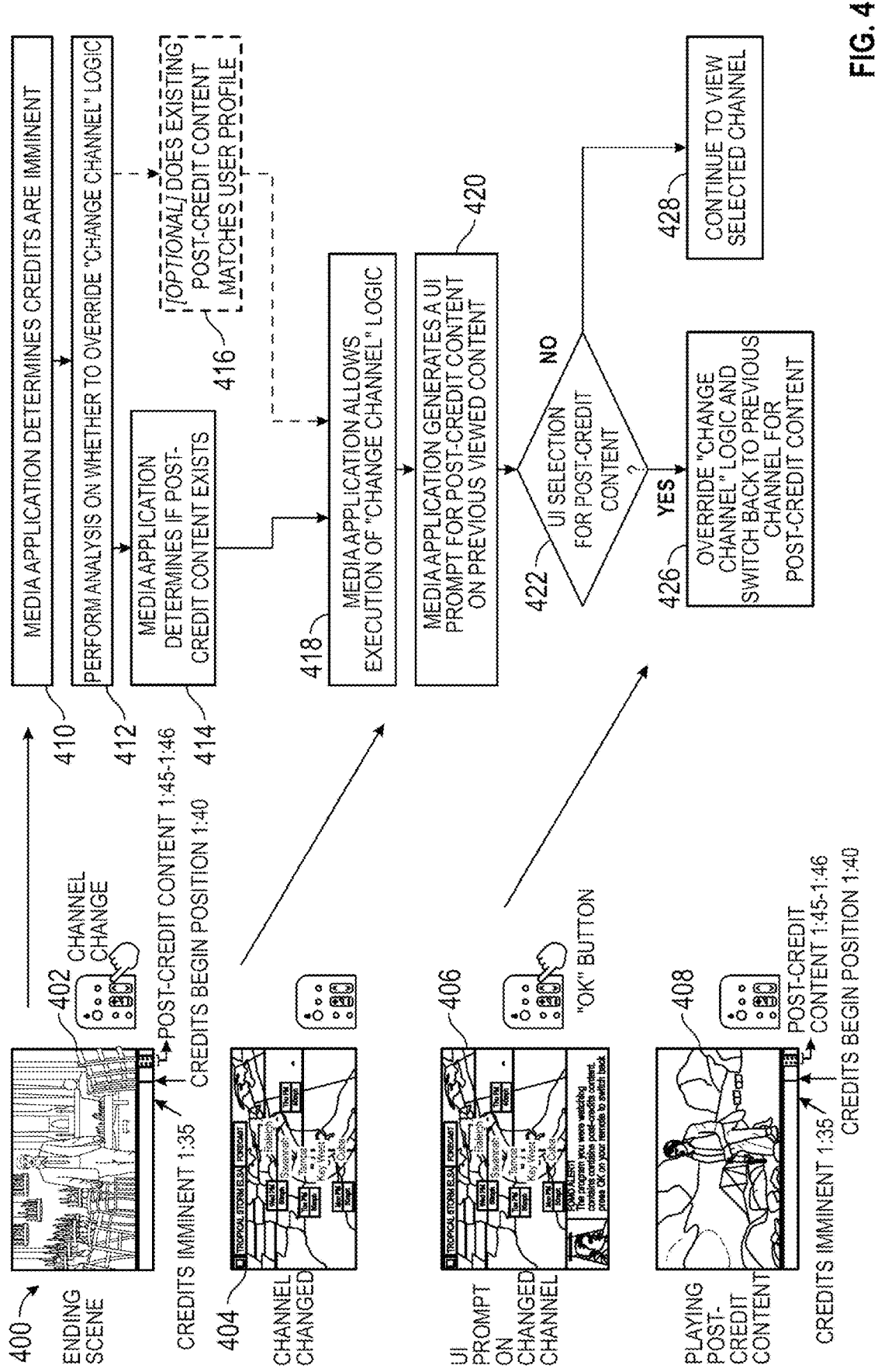
FIG. 4 shows an illustrative scenario in which a UI provides additional viewing options for post-credits content in a broadcast-based media application, in accordance with some embodiments of this disclosure.

FIG. 4 shows an illustrative scenario 400 in which a UI provides additional viewing options for post-credits content in a broadcast-based media application, in accordance with some embodiments of this disclosure. The media application may be adapted for broadcast media, which includes emulated broadcast performed via OTT protocols. For example, the media application is playing a media asset, John Wick 4, on a user equipment. The media asset may include credits content and post-credits content. As the media asset proceeds to play, the media application may determine whether the credits are imminent within the media asset as described previously. At 402, as shown in the timeline, the media application determines that the credits are imminent (at 410) at timestamp 1 hr 35 mins, where credits begin at 1 hr 40 mins, and post-credits content begins at 1 hr 45 mins and ends at 1 hr 46 mins. The media application receives a request to change the channel for playing John Wick 4.

The media application, in response to receiving a request to change source for the playing, determines whether the request was received during the credits content and before the post-credits content. In this example, the request to change channel during John Wick 4 was done after the credits begin but before the post-credits content as shown in 402.

The media application may determine whether the media asset includes post-credits content using the techniques as previously described above. In such techniques, various image recognition techniques (optionally implemented alongside machine learning techniques) can be used to determine whether post-credits content is being played. Returning to FIG. 4, at 414, the media application determines whether post-credits content exists using the techniques described above.

At 416, the media application optionally determines whether existing post-credits content metadata matches user profile information. User profile information may include metadata about the user profile based on device usage, browsing history, preferences, surveys completed by the user, etc. The post-credits content metadata may be prepopulated within the media asset. In some embodiments, the post-credits content metadata is determined by the media application using computer vision techniques as described above. In some embodiments, the post-credits content metadata is retrieved from a third-party server. At 418, the media application takes action based on this analysis.

The media application may, in response to determining that the request (e.g., to change channel) was received during the credits content and before the post-credits content, override the request to change the source and generate for display a prompt comprising a first option to confirm the change, a second option to keep playing the media asset, and a third option to set a reminder to watch the post-credits content for the media asset.

At 418, the media application decides to execute the channel change. At 404, the media application changes the channel from John Wick 4 to the Weather Channel. At 420, the media application generates for display a UI prompt (406) reciting "FOMO ALERT! The program you were watching contains post-credits content. Press OK on your remote to switch back!"

At 422, the media application determines if a UI response was received to switch back to the previously watched content, or alternatively stay on the changed channel. In this example, the media application receives a UI selection to switch back to John Wick 4 (426) to view the post-credits content, and the media application switches back to John Wick 4, as seen at 408. Alternatively, the media application may receive a UI selection to continue to view the selected channel (428).

In other embodiments, the media application is playing a media asset, John Wick 4, on a user equipment. The media asset may include credits content and post-credits content. As the media asset proceeds to play, instead of the media application determining whether the credits are imminent within the media asset as described previously, the media application determines whether a time threshold has been met. For example, the time threshold may be a pre-configured value of one hour and 20 minutes to ensure that a significant portion of the media asset has been viewed. In some embodiments, the time threshold may be just one second in order to provide functionality that any viewing of a media asset is sufficient for the prompting of post-credits content.

The media application receives a request to change source from the media asset currently being generated for display to another source. In response to receiving a request to change source for the playing, the media application changes the source to the new desired source as received from the UI. The media application also determines whether the time threshold is met. For example, the request to change channel during John Wick 4 to the Weather Channel may be made after two hours of viewing, after a major villain is killed. The media application changes the channel to the Weather Channel and determines that the time threshold is pre-configured to be one hour and 30 minutes. Thus, the media application determines that the time threshold is met.

The media application may determine whether the media asset includes post-credits content using the techniques as previously described above. In such techniques, various image recognition techniques (optionally implemented alongside machine learning techniques) can be used to determine whether post-credits content is being played. In this example, the media application determines that John Wick 4 has post-credits content from metadata.

The media application determines when the post-credits content from the previous source (e.g., John Wick 4) is imminent using techniques described above (e.g., computer vision with potential machine learning, and/or metadata) and generates for display a prompt on the current changed source (e.g., the Weather Channel). For example, the prompt may include "FOMO ALERT! The program you were watching contains post-credits content. Press OK on your remote to switch back!" The media application may provide a number of options (or actions) to select.

The media application determines if a UI response was received to switch back to the previously watched content, or alternatively stay on the changed channel. In this example, the media application receives a UI selection to switch back to John Wick 4 to view the post-credits content and the media application switches back to John Wick 4. In some embodiments, the options include to view the post-credits content on a second user equipment. For example, the user equipment may be a mobile phone, and the media application may generate for display the content on the mobile phone when the post-credits content is available. In some embodiments, the options include to digitally store the post-credits content. For example, the media application can DVR the post-credits content for John Wick 4 such that the end user may, at their own convenience, watch the post-credits content for John Wick 4 after viewing the Weather Channel.

Figure 5:
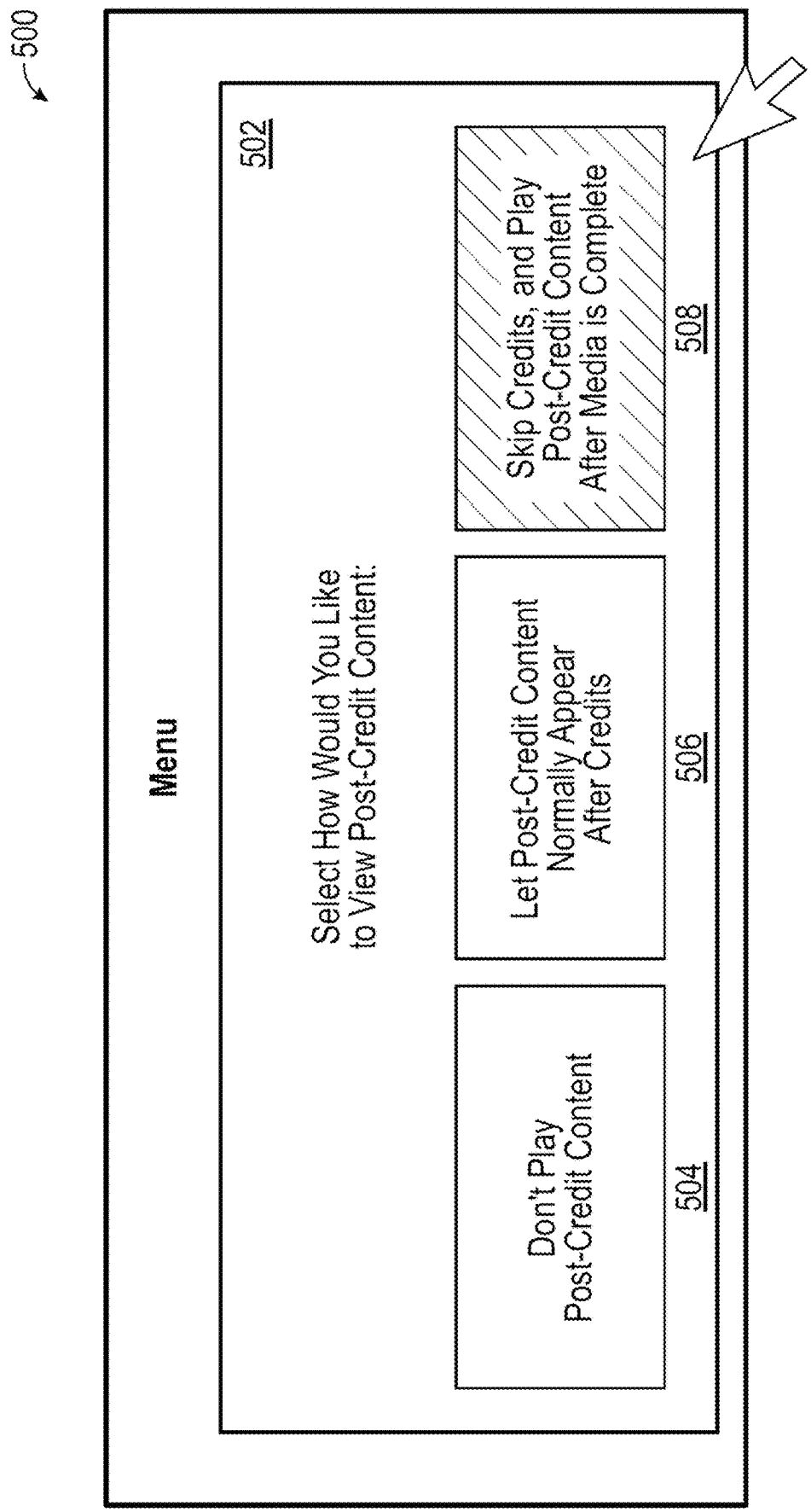
FIG. 5 shows an illustrative scenario in which a UI presents post-credits content preferences for a user profile in a media application, in accordance with some embodiments of this disclosure.

FIG. 5 shows an illustrative scenario 500 in which a UI presents post-credits content preferences for a user profile in a media application, in accordance with some embodiments of this disclosure. The media application may, prior to the playing of the media asset, receive a user interface selection for preferred configuration of modification of the playing of the media asset and a plurality of other media assets. The preferred configuration of modification may include selection of one of automatically continuing to play the credits content and the post-credits content, or automatically skipping the credits content to play the post-credits content. In FIG. 5, the media application provides a UI prompt with options regarding post-credits content preferences. 502 shows a menu block having various options including "Don't play post-credits content" 504, "Let post-credits content normally appear after credits" 506, and "Skip credits, and play post-credits content after media asset is complete" 508. The media application may receive a UI selection of one of these preferences and apply it as a pre-configured preference for future content.

Figure 6:
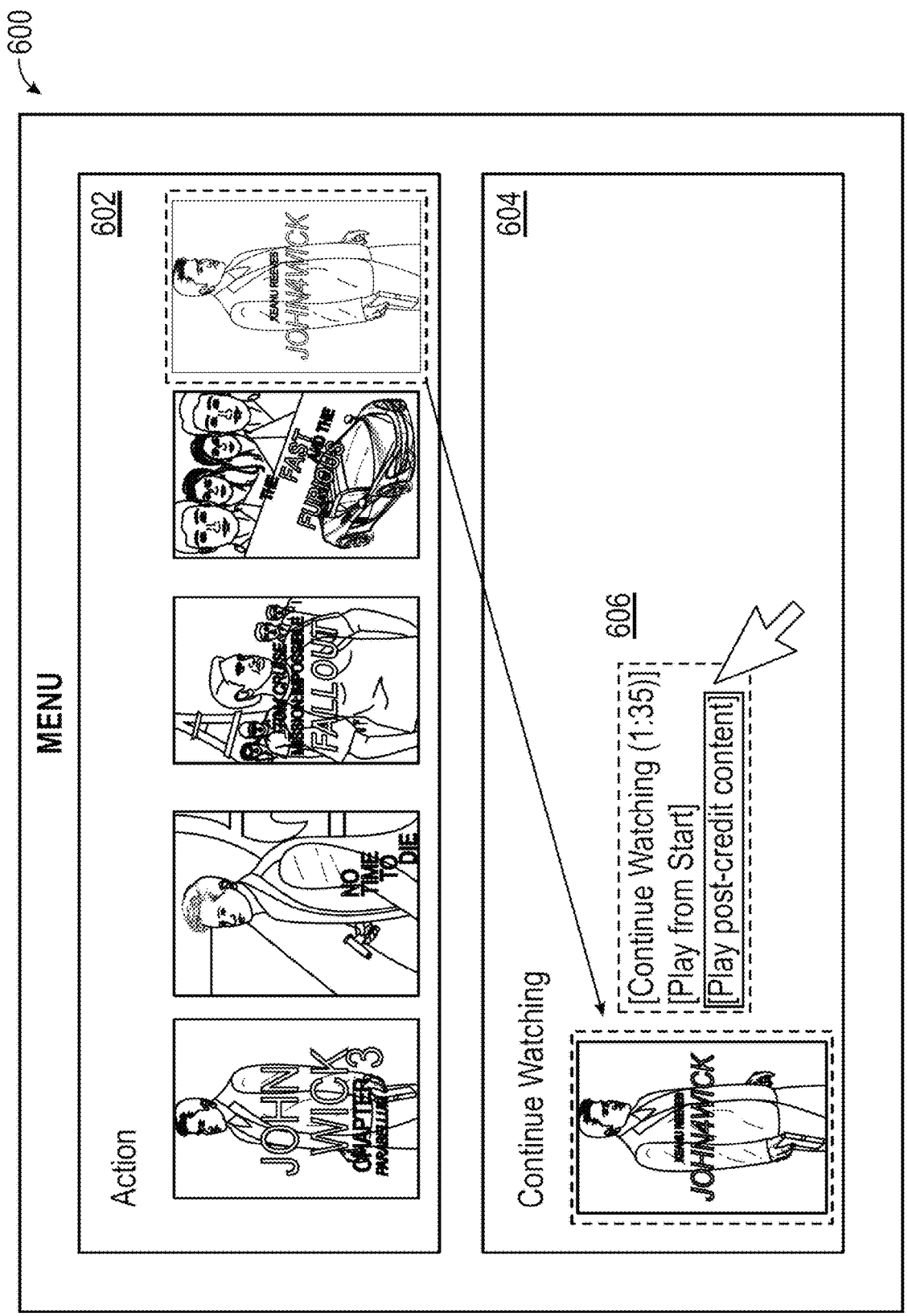
FIG. 6 shows an illustrative scenario in which a UI presents recently watched media assets with optionality for playback position including post-credits content, in accordance with some embodiments of this disclosure.

FIG. 6 shows an illustrative scenario 600 in which a UI presents recently watched media assets with optionality for playback position including post-credits content, in accordance with some embodiments of this disclosure. In some embodiments, the media application, at the media asset menu, has a segmented UI including a genre tier. In this example, the genre tier shown at 602 is "Action." There is also a "Continue Watching" tier 604. John Wick 4 was initially classified in the Action tier, but since the media application has stored a previous selection of John Wick 4 with partial playtime (e.g., it has not completed), it has been assigned to the "Continue Watching" tier. The media application provides for a UI prompt with a menu having multiple options including "[Continue watching (1:35)], [Play from start], and [Play post-credits content]." In some embodiments, because the playlist meets the threshold for "Credits imminent," the media application provides for the option "Play post-credits content." In this way, the option to play post-credits content is not a spoiler.

Figure 7:
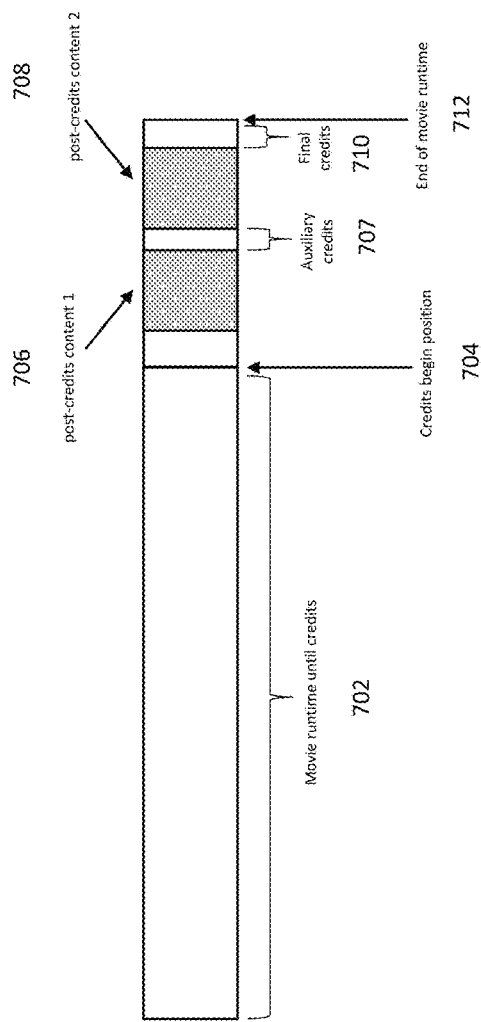
FIG. 7 shows an illustrative scenario of a media asset timeline including multiple post-credits contents, in accordance with some embodiments of this disclosure.

In some embodiments, there may be multiple post-credits content items within a single media asset. FIG. 7 shows an illustrative scenario 700 of a media asset timeline including multiple post-credits content items, in accordance with some embodiments of this disclosure. In some embodiments, the media asset timeline may be visualized as shown in FIG. 7 with a "Movie runtime until credits" shown at 702. The credits begin at 704. A first post-credits content item begins at 706. This is followed by shorter auxiliary credits at 707. A second post-credits content item begins at 708, followed by final credits at 710. This would be the final end runtime of the entire media asset 712. It should be noted that there are multiple post-credits contents within a single media asset after credits commence. In some embodiments, there may be multiple and numerous amounts of post-credits contents within a single media asset. In this scenario, the media application implements the multiple post-credits content items into its processes—for example, a UI prompt may include selection of multiple post-credits content items. In other embodiments, the media application may promote a post-credits content item to a particular user profile if the metadata of the user profiles matches that of the metadata of the particular post-credits content item of the multiple post-credits content items.

Figure 8:
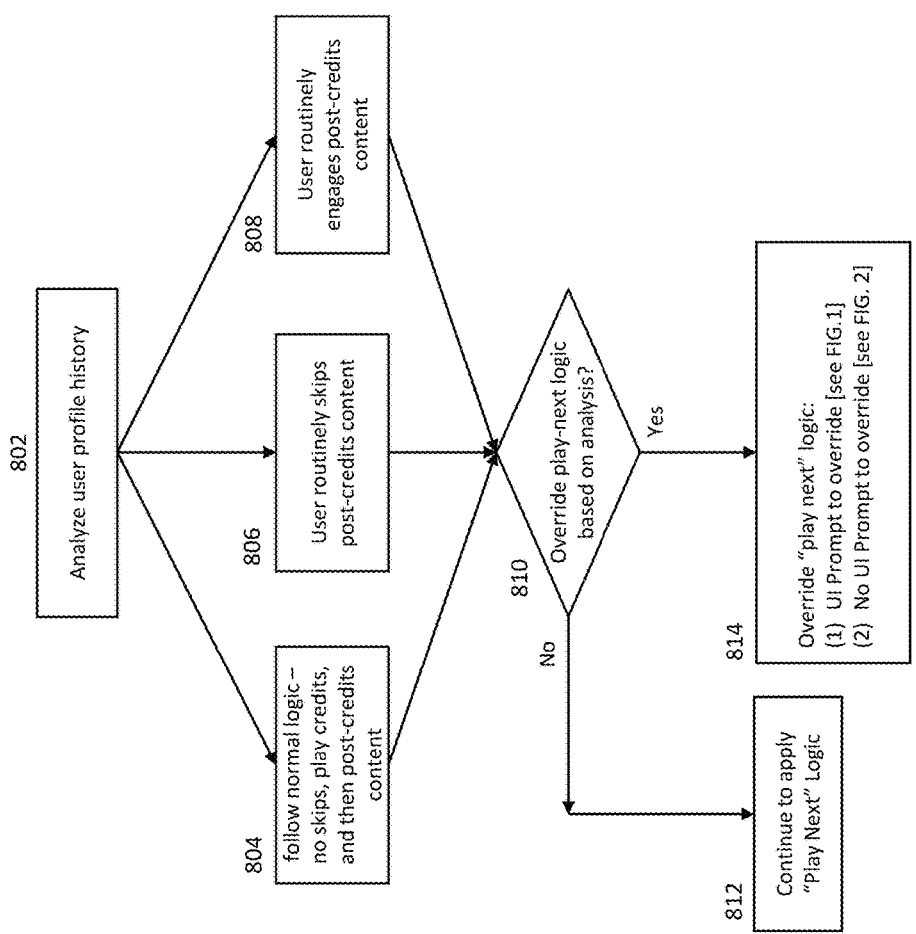
FIG. 8 shows a flowchart of a detailed illustrative process for analyzing user profile history to override play-next logic, in accordance with some embodiments of this disclosure.

FIG. 8 shows a flowchart of a detailed illustrative process 800 for analyzing user profile history to override play-next logic, in accordance with some embodiments of this disclosure. At 802, the media application analyzes user profile history. In some embodiments, the media application analyzes user profile history by processing data stored in the media application from all previous content viewed on a particular user profile. In some embodiments, the media application analyzes user profile history by processing data stored in one or more user equipment devices. Based on the analyses conducted, the media application may determine what type of behavior is most exhibited for a particular user profile. For example, the user profile may prefer at least one of following normal logic-no skips, play credits and then post-credits content (804); or routinely skipping post-credits content (806); or routinely engaging post-credits content (808). The media application may determine a preference of one of the options above. This may be done with a pre-defined threshold of selection, a majority historical selection, or a machine learning algorithm that learns the patterns and behaviors based on the training data (e.g., historical user profile data). Based on this determined preference, the media application may override the play-next logic ("Yes" at 810), and implement various systems and methods outlined in FIGS. 1-3. Alternatively, if the media application does not override the play-next logic ("No" at 810), it may continue to implement play-next logic (812). In some embodiments, the media application may determine behaviors based on a plurality of user profiles and apply it to a specific user profile.

Figure 9:
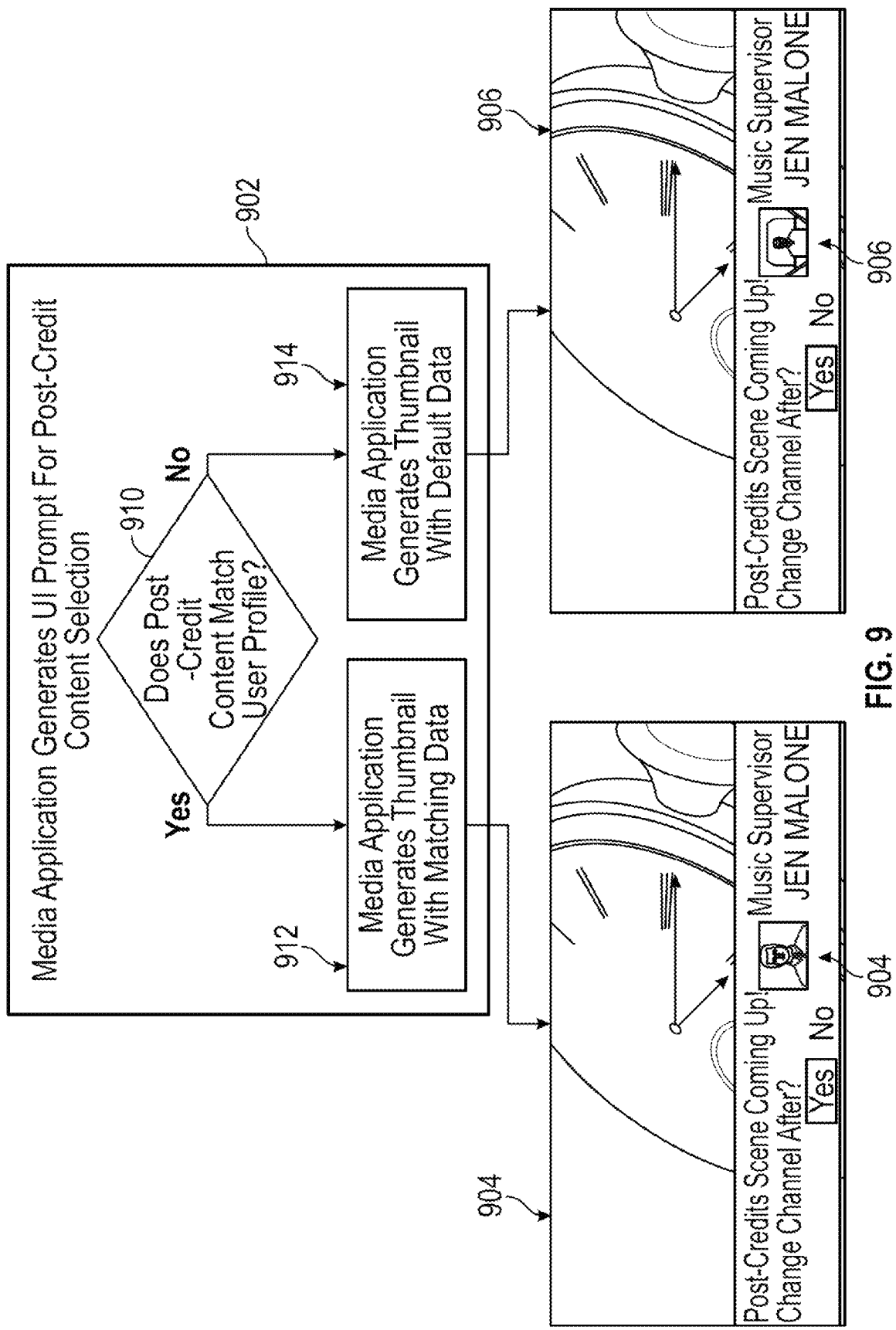
FIG. 9 shows an illustrative scenario of a UI generating a modified thumbnail of a prompt for post-credits content in a media application, in accordance with some embodiments of this disclosure.

FIG. 9 shows an illustrative scenario 900 of a UI generating a modified thumbnail of a prompt for post-credits content in a media application, in accordance with some embodiments of this disclosure. At 902, the media application may generate a UI prompt for post-credits content selection. At 910, the media application may determine whether the post-credits content matches the user profile based on techniques discussed previously. If the media application determines that the post-credits content matches the user profile, at 912, a thumbnail with matching data is generated. In the present example, the media application is playing John Wick 4 and the user profile has a history of watching media assets including the actor Donnie Yen. The media application determines that the post-credits content contains metadata related to Donnie Yen. The media application then determines a frame from the post-credits content with Donnie Yen that meets a display criterion. The display criterion may be a pre-defined threshold of sharpness, color palette, ratio of actor to screen, etc. The media application then generates a thumbnail based on the frame, and it is generated for display as shown in 906. Alternatively, if the user profile does not match any of the metadata from the post-credits content, the media application will display the default thumbnail for the post-credits content as shown in 904. In some embodiments, the media application may generate a specific UI prompt text based on any combination of the post-credits content media and user profile metadata. For example, if the user profile shows a preference for the actor Donnie Yen, the UI prompt may read "Post-credits content coming up featuring Donnie Yen!" The media application may have further logic applied where it ensures that the promotion of Donnie Yen is not a spoiler to the post-credits content so as to preserve the viewing experience. If the media application determines it may be considered a spoiler given the metadata of the post-credits content, the media application may generate an alternate UI prompt to not integrate spoilers into the UI prompt. In some embodiments, the media application may determine from the user profile metadata that the user prefers Donnie Yen particularly in action scenes based on social media posts activity of the user profile. The media application may then further determine the thumbnail to match the specific preference of Donnie Yen in an action scene within the post-credits content and use the relevant frame for the thumbnail to generate for display. In some embodiments, the media application further generates a UI prompt using this specific preference information such as "Donnie Yen in beast mode . . . " to allude to the action about to ensue.

Figure 10:
FIG. 10 shows an illustrative scenario of a UI generating a modified media application, in accordance with some embodiments of this disclosure.

FIG. 10 shows an illustrative scenario 1000 of a UI generating a modified media application, in accordance with some embodiments of this disclosure. In some embodiments, the media application may analyze behavior subsequent to viewing post-credits content. For example, if the media application determines a user subscribes to actor Donnie Yen content subsequent to the viewing of the post-credits content for John Wick 4 featuring actor Donnie Yen, the media application may then promote media assets featuring Donnie Yen for the corresponding user profile. As shown in FIG. 10, the top of the media guide recites "Rogue One: A Star Wars Story" and underneath reciting "Because you subscribed to Donnie Yen content."

Figure 11:
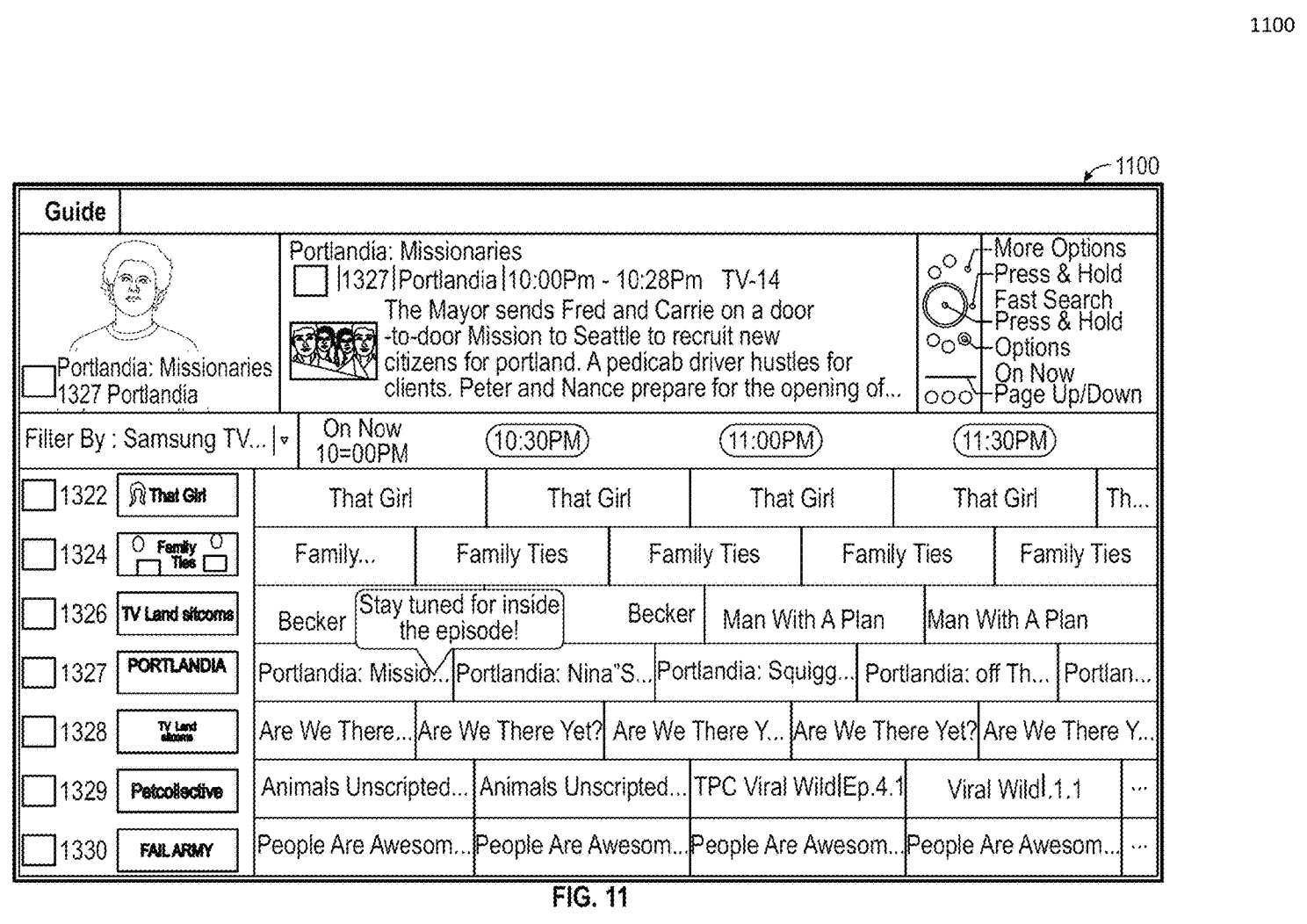

FIG. 11 shows an illustrative scenario 1100 of a UI generating a prompt for post-credits content in a broadcast-based media application, in accordance with some embodiments of this disclosure. In some embodiments, the media application may promote post-credits content in a broadcast media guide as shown in FIG. 11, where the UI selection is hovering over "Portlandia" on channel 1327. The media application, upon determining that a particular media asset contains post-credits content, may promote the post-credits content via a UI prompt. As seen in FIG. 11, the UI prompt states, "Stay tuned for inside the episode!" In some embodiments, the media application promotes only those types of post-credits content that are not spoilers. For example, "inside the episode" is not a spoiler, but rather additional content for interested viewers. A spoiler may include "Watch the alternative ending" or "Watch the after-credits scene." In other embodiments, the media application may wish to tease post-credits content as a means to keep the user engaged and may utilize UI prompts to do so such as "You won't believe the post-credits scene!"

Figure 12:
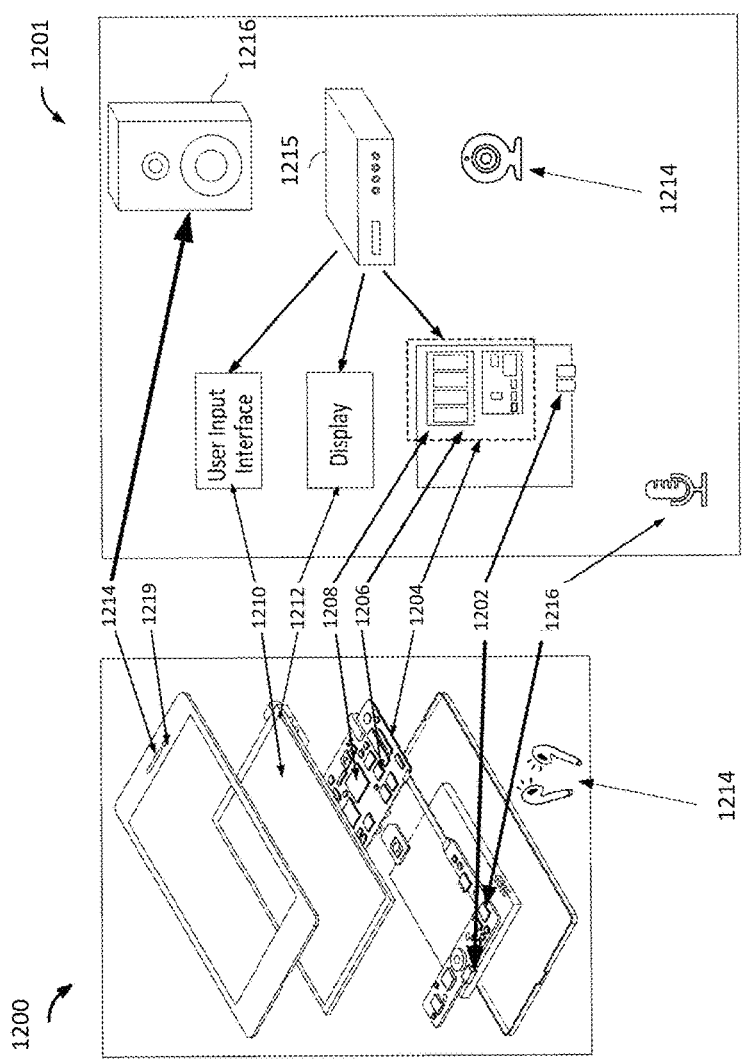
FIG. 12 shows illustrative user equipment devices, in accordance with some embodiments of this disclosure.
Figure 13:
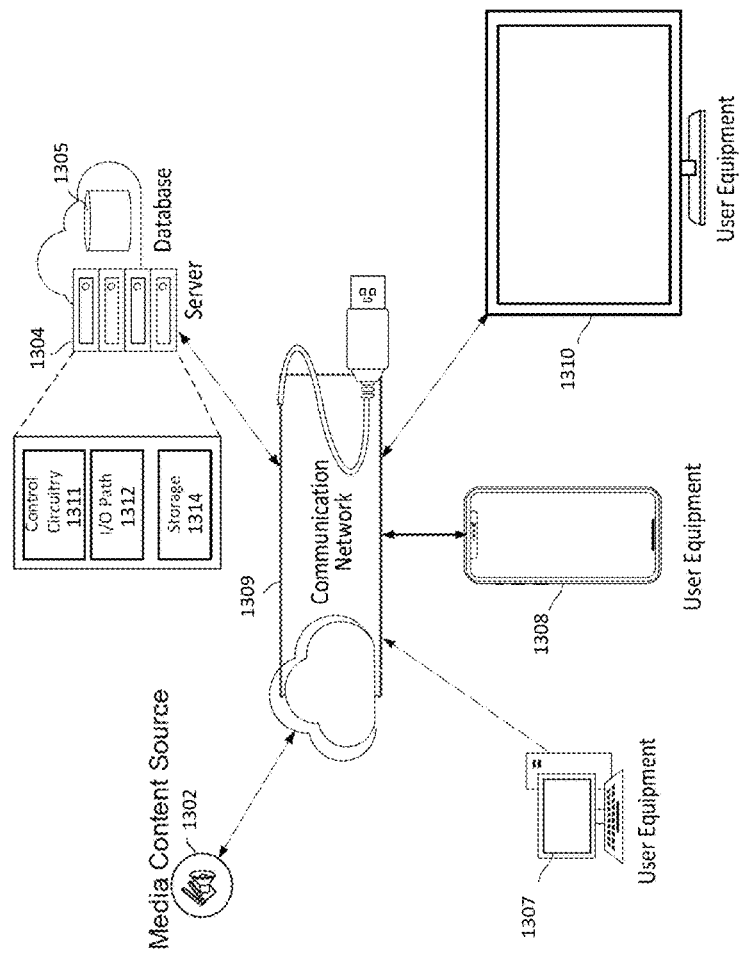
FIG. 13 shows illustrative systems, in accordance with some embodiments of this disclosure.

FIGS. 12-13 describe illustrative devices, systems, servers, and related hardware for a media application for efficient navigation of a plurality of media assets and for playing post-credits content in media assets by overriding play-next logic, in accordance with some embodiments of this disclosure. FIG. 12 shows generalized embodiments of illustrative user devices 1200 and 1201. For example, user equipment device 1200 may be a smartphone device, a tablet, smart glasses, a virtual reality or augmented reality device, or any other suitable device capable of consuming media assets and capable of transmitting and receiving data over a communication network. In another example, user equipment device 1201 may be a user television equipment system or device. User television equipment device 1201 may include set-top box 1215. Set-top box 1215 may be communicatively connected to microphone 1216, audio output equipment (e.g., speaker or headphones 1214), and display 1212. In some embodiments, microphone 1216 may receive audio corresponding to a voice of a user, e.g., a voice command. In some embodiments, display 1212 may be a television display or a computer display. In some embodiments, set-top box 1215 may be communicatively connected to user input interface 1210. In some embodiments, user input interface 1210 may be a remote control device. Set-top box 1215 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 12. In some embodiments, device 1200 may comprise any suitable number of sensors, as well as a GPS module (e.g., in communication with one or more servers and/or cell towers and/or satellites) to ascertain a location of device 1200.

Each one of user equipment device 1200 and user equipment device 1201 may receive content and data via input/output (I/O) path 1202. I/O path 1202 may provide content (e.g., broadcast programming, on-demand programming, Internet content, content available over a local area network (LAN) or wide area network (WAN), and/or other content) and data to control circuitry 1204, which may comprise processing circuitry 1206 and storage 1208. Control circuitry 1204 may be used to send and receive commands, requests, and other suitable data using I/O path 1202, which may comprise I/O circuitry. I/O path 1202 may connect control circuitry 1204 (and specifically processing circuitry 1206) to one or more communications paths (described below). I/O functions may be provided by one or more of these communications paths, but are shown as a single path in FIG. 12 to avoid overcomplicating the drawing. While set-top box 1215 is shown in FIG. 12 for illustration, any suitable computing device having processing circuitry, control circuitry, and storage may be used in accordance with the present disclosure. For example, set-top box 1215 may be replaced by, or complemented by, a personal computer (e.g., a notebook, a laptop, a desktop), a smartphone (e.g., device 1200), a tablet, a network-based server hosting a user-accessible client device, a non-user-owned device, any other suitable device, or any combination thereof.

Control circuitry 1204 may be based on any suitable control circuitry such as processing circuitry 1206. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1204 executes instructions for the Media application stored in memory (e.g., storage 1208). Specifically, control circuitry 1204 may be instructed by the Media application to perform the functions discussed above and below. In some implementations, processing or actions performed by control circuitry 1204 may be based on instructions received from the Media application.

In client/server-based embodiments, control circuitry 1204 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 12, the instructions may be stored in storage 1208, and executed by control circuitry 1204 of a device 1200.

In some embodiments, the media application may be a client/server application where only the client application resides on device 1200, and a server application resides on an external server (e.g., server 1304 and/or server 1316). For example, the media application may be implemented partially as a client application on control circuitry 1204 of device 1200 and partially on server 1304 as a server application running on control circuitry 1311. Server 1304 may be a part of a local area network with one or more of devices 1200 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 1304), referred to as "the cloud." Device 1200 may be a cloud client that relies on the cloud computing capabilities from server 1304 to determine whether processing should be offloaded and facilitate such offloading. When executed by control circuitry 1204 or 1311, the media application may instruct control circuitry 1204 or 1311 circuitry to perform processing tasks for the client device and facilitate a media consumption session integrated with social network services. The client application may instruct control circuitry 1204 to determine whether processing should be offloaded.

Control circuitry 1204 may include communications circuitry suitable for communicating with a server, social network service, a table or database server, or other networks or servers The instructions for carrying out the above-mentioned functionality may be stored on a server (which is described in more detail in connection with FIG. 12). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 12). In addition, communications circuitry may include circuitry that enables peer-to-peer communication of user equipment devices, or communication of user equipment devices in locations remote from each other (described in more detail below).

Memory may be an electronic storage device provided as storage 1208 that is part of control circuitry 1204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1208 may be used to store various types of content described herein as well as media application data described above. Nonvolatile memory may also be used (e.g., to launch a boot-up routine and other instructions). Cloud-based storage may be used to supplement storage 1208 or instead of storage 1208.

Control circuitry 1204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1204 may also include scaler circuitry for upconverting and downconverting content into the preferred output format of user equipment 1200. Control circuitry 1204 may also include digital-to-analog converter circuitry and analog-to-digital converter circuitry for converting between digital and analog signals. The tuning and encoding circuitry may be used by user equipment device 1200, 1201 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1208 is provided as a separate device from user equipment device 1200, the tuning and encoding circuitry (including multiple tuners) may be associated with storage 1208.

Control circuitry 1204 may receive instruction from a user by way of user input interface 1210. User input interface 1210 may be any suitable user interface, such as a remote control, mouse, trackball, keypad, keyboard, touch screen, touchpad, stylus input, joystick, voice recognition interface, or other user input interfaces. Display 1212 may be provided as a stand-alone device or integrated with other elements of each one of user equipment device 1200 and user equipment device 1201. For example, display 1212 may be a touch-screen or touch-sensitive display. In such circumstances, user input interface 1210 may be integrated with or combined with display 1212. In some embodiments, user input interface 1210 includes a remote-control device having one or more microphones, buttons, keypads, any other components configured to receive user input or combinations thereof. For example, user input interface 1210 may include a handheld remote-control device having an alphanumeric keypad and option buttons. In a further example, user input interface 1210 may include a handheld remote-control device having a microphone and control circuitry configured to receive and identify voice commands and transmit information to set-top box 1215.

Audio output equipment 1214 may be integrated with or combined with display 1212. Display 1212 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 1212. Audio output equipment 1214 may be provided as integrated with other elements of each one of device 1200 and equipment 1201 or may be stand-alone units. An audio component of videos and other content displayed on display 1212 may be played through speakers (or headphones) of audio output equipment 1214. In some embodiments, audio may be distributed to a receiver (not shown), which processes and outputs the audio via speakers of audio output equipment 1214. In some embodiments, for example, control circuitry 1204 is configured to provide audio cues to a user, or other audio feedback to a user, using speakers of audio output equipment 1214. There may be a separate microphone 1216 or audio output equipment 1214 may include a microphone configured to receive audio input such as voice commands or speech. For example, a user may speak letters or words that are received by the microphone and converted to text by control circuitry 1204. In a further example, a user may voice commands that are received by a microphone and recognized by control circuitry 1204. Camera 1218 may be any suitable video camera integrated with the equipment or externally connected. Camera 1218 may be a digital camera comprising a charge-coupled device (CCD) and/or a complementary metal-oxide semiconductor (CMOS) image sensor. Camera 1218 may be an analog camera that converts to digital images via a video card.

The media application may be implemented using any suitable architecture. For example, it may be a stand-alone application wholly-implemented on each one of user equipment device 1200 and user equipment device 1201. In such an approach, instructions of the application may be stored locally (e.g., in storage 1208), and data for use by the application is downloaded on a periodic basis (e.g., from an out-of-band feed, from an Internet resource, or using another suitable approach). Control circuitry 1204 may retrieve instructions of the application from storage 1208 and process the instructions to provide media consumption and social network interaction functionality and generate any of the displays discussed herein. Based on the processed instructions, control circuitry 1204 may determine what action to perform when input is received from user input interface 1210. For example, movement of a cursor on a display up/down may be indicated by the processed instructions when user input interface 1210 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 1204 may allow a user to provide user profile information or may automatically compile user profile information. For example, control circuitry 1204 may access and monitor network data, video data, audio data, processing data, participation data from a media application and social network profile. Control circuitry 1204 may obtain all or part of other user profiles that are related to a particular user (e.g., via social media networks), and/or obtain information about the user from other sources that control circuitry 1204 may access. As a result, a user can be provided with a unified experience across the user's different devices.

In some embodiments, the media application is a client/server-based application. Data for use by a thick or thin client implemented on each one of user equipment device 1200 and user equipment device 1201 may be retrieved on-demand by issuing requests to a server remote to each one of user equipment device 1200 and user equipment device 1201. For example, the remote server may store the instructions for the application in a storage device. The remote server may process the stored instructions using circuitry (e.g., control circuitry 1204) and generate the displays discussed above and below. The client device may receive the displays generated by the remote server and may display the content of the displays locally on device 1200. This way, the processing of the instructions is performed remotely by the server while the resulting displays (e.g., that may include text, a keyboard, or other visuals) are provided locally on device 1200. Device 1200 may receive inputs from the user via input interface 1210 and transmit those inputs to the remote server for processing and generating the corresponding displays. For example, device 1200 may transmit a communication to the remote server indicating that an up/down button was selected via input interface 1210. The remote server may process instructions in accordance with that input and generate a display of the application corresponding to the input (e.g., a display that moves a cursor up/down). The generated display may then be transmitted to device 1200 for presentation to the user.

In some embodiments, the media application may be downloaded and interpreted or otherwise run by an interpreter or virtual machine (run by control circuitry 1204). In some embodiments, the media application may be encoded in the ETV Binary Interchange Format (EBIF), received by control circuitry 1204 as part of a suitable feed, and interpreted by a user agent running on control circuitry 1204. For example, the media application may be an EBIF application. In some embodiments, the media application may be defined by a series of JAVA-based files that are received and run by a local virtual machine or other suitable middleware executed by control circuitry 1204. In some of such embodiments (e.g., those employing MPEG-2 or other digital media encoding schemes), the media application may be, for example, encoded and transmitted in an MPEG-2 object carousel with the MPEG audio and video packets of a program.

FIG. 13 is a diagram of an illustrative system 1300, in accordance with some embodiments of this disclosure. User equipment devices 1307, 1308, 1310 (e.g., user device; devices or any other suitable devices, or any combination thereof) may be coupled to communication network 1306. Communication network 1306 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 1306) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 13 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 1306.

System 1300 may comprise media content source 1302, one or more servers 1304, and one or more social network services. In some embodiments, the media application may be executed at one or more of control circuitry 1311 of server 1304 (and/or control circuitry of user equipment devices 1307, 1308, 1310.

In some embodiments, server 1304 may include control circuitry 1311 and storage 1314 (e.g., RAM, ROM, Hard Disk, Removable Disk, etc.). Instructions for the media application may be stored in storage 1314. In some embodiments, the media application, via control circuitry, may execute functions outlined in FIGS. 1-11. Storage 1314 may store one or more databases. Server 1304 may also include an input/output path 1312. I/O path 1312 may provide media consumption data, social networking data, device information, or other data, over a local area network (LAN) or wide area network (WAN), and/or other content and data to control circuitry 1311, which may include processing circuitry, and storage 1314. Control circuitry 1311 may be used to send and receive commands, requests, and other suitable data using I/O path 1312, which may comprise I/O circuitry. I/O path 1312 may connect control circuitry 1311 (and specifically control circuitry) to one or more communications paths. I/O path 1312 may comprise I/O circuitry.

Control circuitry 1311 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1311 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1311 executes instructions for an emulation system application stored in memory (e.g., the storage 1314). Memory may be an electronic storage device provided as storage 1314 that is part of control circuitry 1311.

Figure 14:
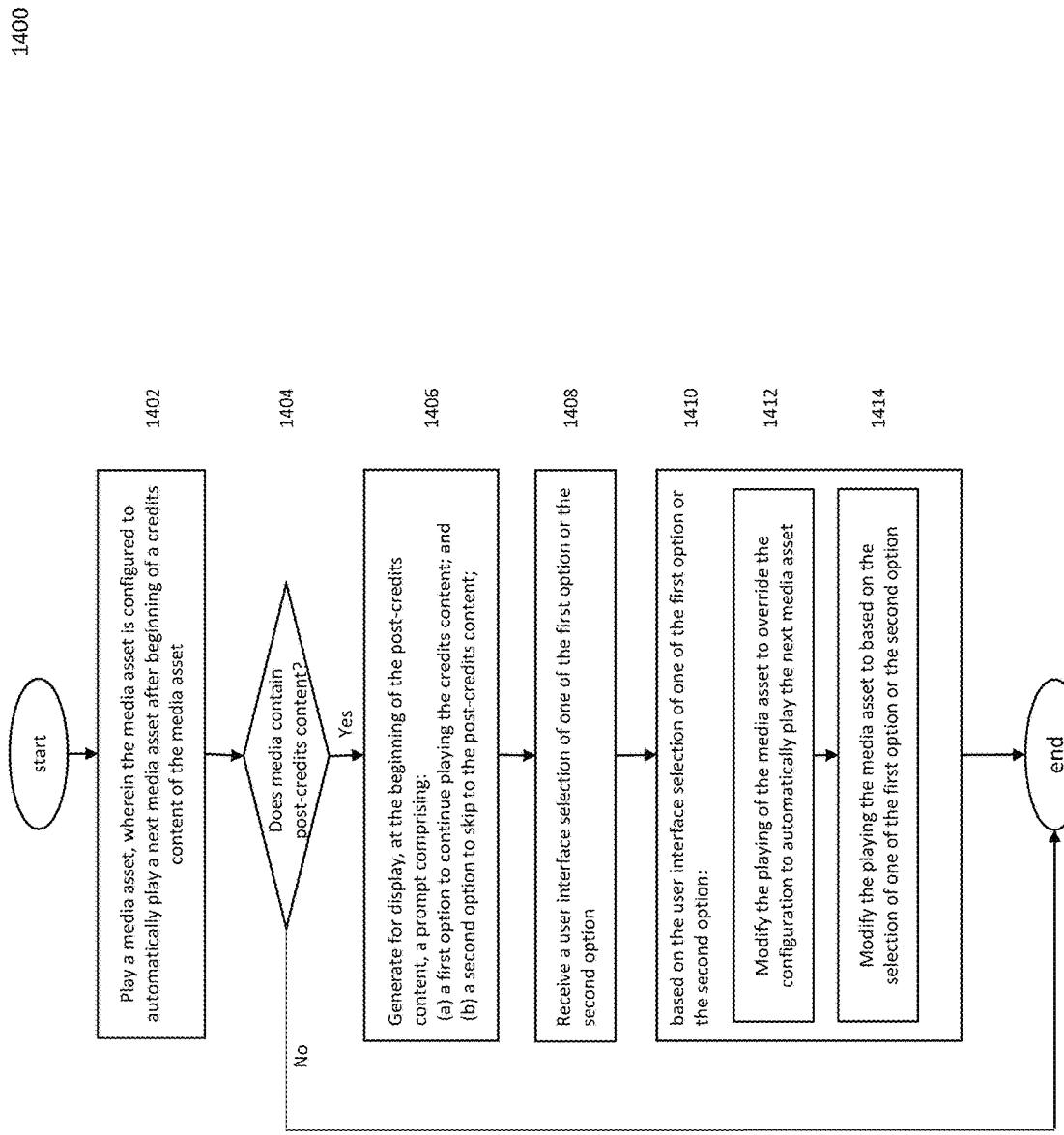
FIG. 14 is a flowchart of a detailed illustrative process for overriding a configuration to automatically play the next media asset in an over-the-top streaming media application, in accordance with some embodiments of this disclosure.

FIG. 14 is a flowchart 1400 of a detailed illustrative process for overriding a configuration to automatically play the next media asset in an over-the-top streaming media application, in accordance with some embodiments of this disclosure. In various embodiments, the individual steps of process 1400 may be implemented by one or more components of the devices and systems of FIGS. 1-13. Although the present disclosure may describe certain steps of process 1400 (and of other processes described herein) as being implemented by certain components of the devices and systems of FIGS. 1-13, this is for purposes of illustration only, and it should be understood that other components of the devices and systems of FIGS. 1-13 may implement those steps instead.

At 1402, the media application, via the control circuitry 1311, plays a media asset, wherein the media asset is configured to automatically play a next media asset after beginning of credits content of the media asset. In some embodiments, the media asset is played from at least one of the server 1304, database 1305, storage 1314, media content source 1302, and user equipment 1307, 1308, 1310. At 1404, the media application, via control circuitry 1311, determines whether the media asset contains post-credits content. If the media application, via control circuitry 1311, determines, at 1404, that the media asset does not contain post-credits content, then processing proceeds to end. If the media application, via control circuitry 1311, determines, at 1404, that the media asset contains post-credits content, then processing proceeds to 1406. At 1406, the media application, via control circuitry 1311, generates for display, at the beginning of the post-credits content, a prompt including a first option to continue playing the credits content and a second option to skip to the post-credits content. In some embodiments, the media application may generate for display the prompt via the I/O path 1312 to one or more user equipment 1307, 1308, 1310. At 1408, the media application, via control circuitry 1311, receives a user interface selection of one of the first option or the second option. In some embodiments, the media application may generate for display the prompt via the I/O path 1312 to one or more user equipment 1307, 1308, 1310. At 1410, the media application, via control circuitry 1311, based on the user interface selection of one of the first option or second option, modifies the playing of the media asset to override the configuration to automatically play the next media asset, or modifies the playing the media asset to based on the selection of one of the first option or the second option.

Figure 15:
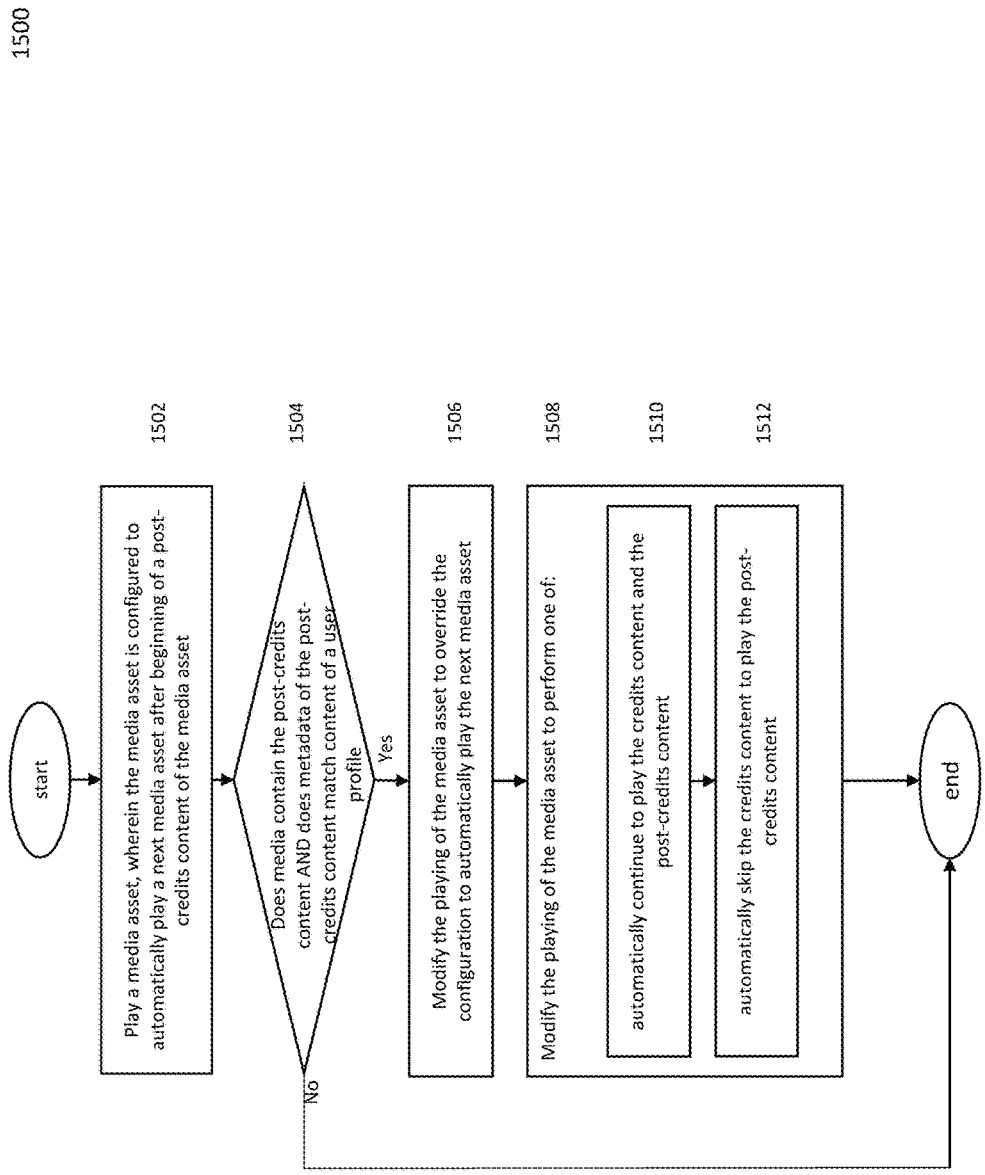
FIG. 15 is a flowchart of another detailed illustrative process for overriding a configuration to automatically play the next media asset in an over-the-top streaming media application, in accordance with some embodiments of this disclosure.

FIG. 15 is a flowchart 1500 of another detailed illustrative process for overriding a configuration to automatically play the next media asset in an over-the-top streaming media application, in accordance with some embodiments of this disclosure. At 1502, the media application, via the control circuitry 1311, plays a media asset, wherein the media application is configured to automatically play a next media asset after beginning of a post-credits content of the media asset. In some embodiments, the media asset is played by the media application from at least one of the server 1304, database 1305, storage 1314, media content source 1302, and user equipment 1307, 1308, 1310. At 1504, the media application, via control circuitry 1311, determines whether the media asset contains post-credits content and whether metadata of the post-credits content matches the content of a user profile. In some embodiments, the metadata of the post-credits content is accessed via the I/O path 1312 to at least one of server 1304, database 1305, storage 1314, media content source 1302, and user equipment 1307, 1308, 1310. In some embodiments, the content of a user-profile is accessed via the I/O path 1312 to at least one of server 1304, database 1305, storage 1314, media content source 1302, and user equipment 1307, 1308, 1310. If the media application, via control circuitry 1311, determines at 1504 that the media asset does not contain post-credits content and the metadata of the post-credits content does not match the content of a user profile, then processing proceeds to end. If the media application, via control circuitry 1311, determines at 1504 that the media asset contains post-credits content and the metadata of the post-credits content matches the content of a user profile, then processing proceeds to 1506. At 1506, the media application, via control circuitry 1311, modifies the playing of the media asset to override the configuration to automatically play the next media asset. At 1508, the media application, via control circuitry 1311, modifies the playing of the media asset to perform one of these options: automatically continue to play the credits content and the post-credits content (1510) or automatically skip the credits content to play the post-credits content (1512).

Figure 16:
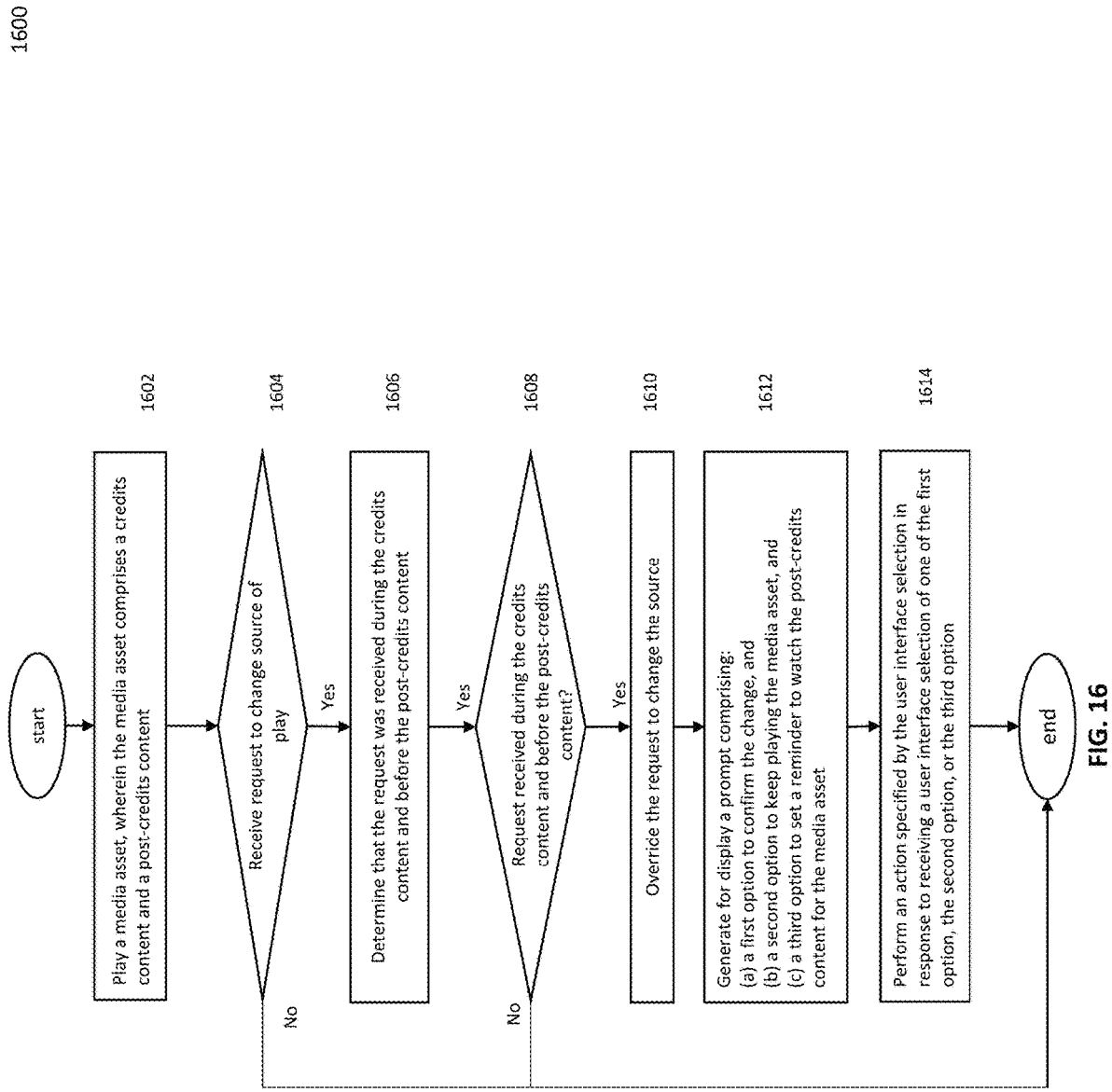
FIG. 16 is a flowchart of a detailed illustrative process for overriding a request to change source in a broadcast media application.

FIG. 16 is a flowchart 1600 of a detailed illustrative process for overriding a request to change source in a broadcast media application. At 1602, the media application, via the control circuitry 1311, plays a media asset, wherein the media asset comprises credits content and post-credits content. In some embodiments, the media asset is played from at least one of the server 1304, database 1305, storage 1314, media content source 1302, and user equipment 1307, 1308, 1310. At 1604, the media application, via control circuitry 1311, determines whether a request to change source of play was received. In some embodiments, the media application receives the request to change source via the I/O path 1312 from at least one of server 1304, and user equipment 1307, 1308, 1310. If the media application, via control circuitry 1311, determines at 1604 that a request to change source of play was not received, then processing proceeds to end. If the media application, via control circuitry 1311, determines at 1604 that the request to change source of play was received, then processing proceeds to 1606. At 1606, the media application, via control circuitry 1311, determines whether the request was received during the credits content and before the post-credits content. If the media application, via control circuitry 1311, determines at 1608 that the request to change source of play was not received during the credits content and not received before the post-credits content, then processing proceeds to end. If the media application, via control circuitry 1311, determines at 1608 that the request to change source of play was received during the credits content and received before the post-credits content, then processing proceeds to 1610. At 1610, the media application, via control circuitry 1311, overrides the request to change the source. At 1612, the media application, via control circuitry 1311, generates for display prompt including a first option to confirm the change, and a second option to keep playing the media asset, a third option to set a reminder to watch the post-credits content for the media asset, and a fourth option to digitally store the post-credits content for the media asset. In some embodiments, the media application may generate for display the prompt via the I/O path 1312 to one or more user equipment 1307, 1308, 1310. At 1614, the media application, via control circuitry 1311, performs an action specified by the user interface selection in response to receiving a user interface selection of one of the first option, the second option, the third option, or the fourth option.

Figure 17:
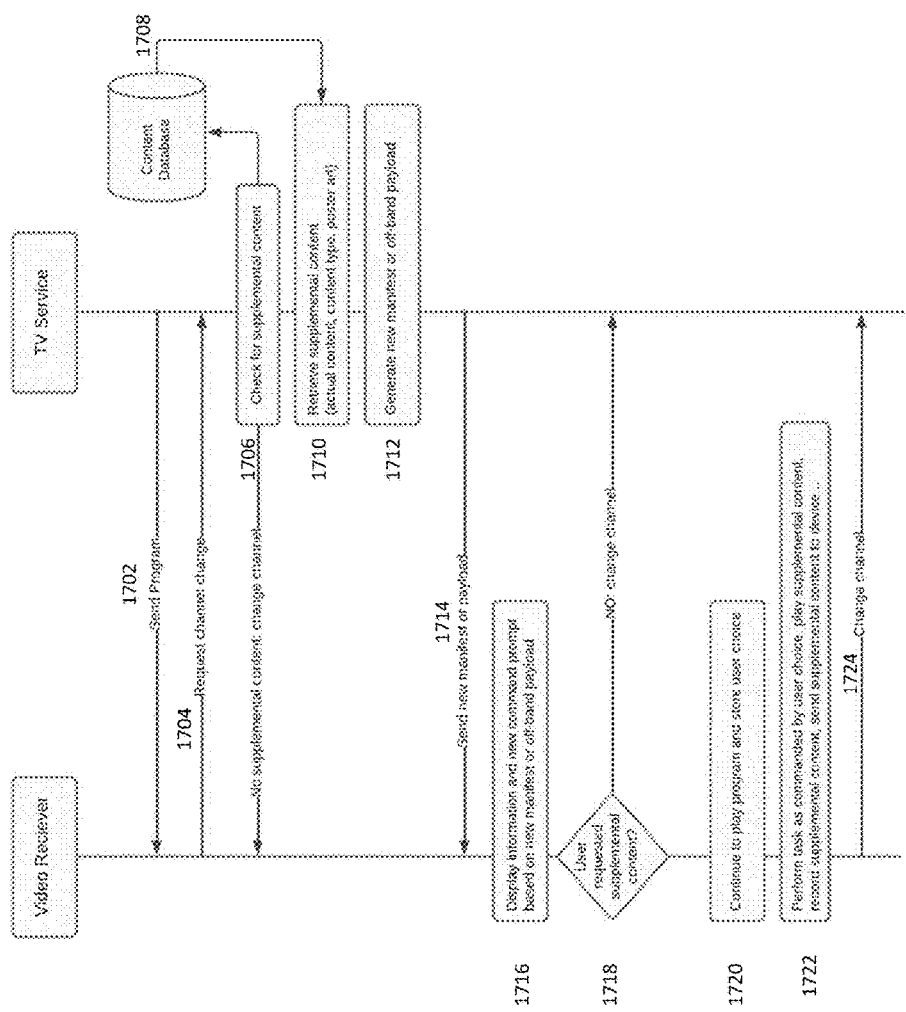
FIG. 17 is a flowchart of a detailed illustrative process of hardware device interaction in a broadcast and/or over-the-top streaming media application, in accordance with some embodiments of this disclosure.

FIG. 17 is a flowchart 1700 of a detailed illustrative process of hardware device interaction in a broadcast and/or over-the-top streaming media application, in accordance with some embodiments of this disclosure. At 1702, the media application, via control circuitry 1311, from the TV service (e.g., media content source 1302) sends a program to a video receiver (e.g., user equipment 1307, 1308, 1310). At 1704, the media application, via control circuitry 1311, receives a channel change request from the video receiver. At 1706, the media application, via control circuitry 1311, checks for supplemental content via the content database 1708 (e.g., media content source 1302, or database 1305). If there is no supplemental content (e.g., post-credits content), this information is relayed from the media application to the video receiver. At 1710, if there is supplemental content, the media application, via control circuitry 1311, retrieves the supplemental content from the content database and, at 1712, generates a new manifest (e.g., new post-credits content). At 1714, the media application, via control circuitry 1311, sends the new manifest to the video receiver. At 1716, the media application, via control circuitry 1311, displays the information and new command prompt based on the new manifest content. At 1718, the media application, via control circuitry 1311, determines whether the user requested supplemental content. If the media application, via control circuitry, determines, at 1718, that the user did not request supplemental content, the processing ends. If the media application, via control circuitry, determines, at 1718, that the user requested supplemental content, the processing continues to 1720. At 1720, the media application, via control circuitry 1311, continues to play the program and stores the user choice. At 1722, the media application, via control circuitry 1311, performs the task as commanded by user choice including one of playing supplemental content, storing supplemental content, or sending supplemental content to a second device. At 1724, the media application, via control circuitry 1311, changes the channel on the TV service.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    playing, by a media application, a media asset, wherein the media application is configured to automatically play a next media asset after beginning of a credits content of the media asset;
    in response to determining that the media asset comprises a post-credits content:
        at the beginning of the credits content generating for display a prompt comprising:
            (a) a first selectable visual option to continue playing the credits content; and
            (b) a second selectable visual option to skip to the post-credits content;
    receiving a user interface selection of one of the first selectable visual option or the second selectable visual option;
    based on the receiving the user interface selection of one of the first selectable visual option or the second selectable visual option:
        modifying the playing of the media asset to override the configuration to automatically play the next media asset; and
        modifying the playing of the media asset to be based on the selection of one of the first selectable visual option or the second selectable visual option.

2. The method of claim 1, wherein the prompt comprises a thumbnail that matches metadata of the media asset and metadata of a user profile.

3. The method of claim 1, wherein receiving the user interface selection of the second selectable visual option to skip to the post-credits content comprises playing the post-credits content immediately.

4. The method of claim 3, further comprising playing a secondary post-credits content subsequent to the post-credits content.

5. The method of claim 1, wherein the modifying the playing of the media asset to be based on the selection of one of the first selectable visual option or the second selectable visual option comprises one of:
    based on selection of the first selectable visual option, continuing to play the credits content instead of skipping the credits content to play the next media asset; or
    based on selection of the second selectable visual option, skipping a portion of the credit content to play the post-credits content instead of skipping the credits content to play the next media asset.

6. A method comprising:
    playing a media asset, wherein the media asset comprises:
        (a) a credits content, and (b) post-credits content;
    in response to receiving a request to change source for the playing:
        determining that the request was received during the credits content and before the post-credits content;
        in response to the determining:
            overriding the request to change the source; and
            generating for display a prompt comprising multiple selectable visual options for controlling the playing; and
    in response to receiving a user interface selection of the multiple selectable visual options, performing the one or more action specified by the user interface selection.

7. The method of claim 6, wherein the one or more selectable visual options comprise at least one of: confirming the change, continuing to play the media asset, setting a reminder to watch the post-credits content for the media asset, instructing the media application to send the post-credits content for the media asset to a second device for viewing, or instructing the media application to digitally record the post-credits content for later viewing.

8. The method of claim 6, wherein the source for the playing includes at least one of a broadcast television channel, emulation of television channels, or emulation of broadcast telecast.

9. A system comprising:
control circuitry configured to:
   play, by a media application, a media asset, wherein the media application is configured to automatically play a next media asset after beginning of a credits content of the media asset;
   in response to determining that the media asset comprises a post-credits content:
      at the beginning of the credits content generate for display a prompt comprising:
         (a) a first selectable visual option to continue playing the credits content; and
         (b) a second selectable visual option to skip to the post-credits content;
   receive a user interface selection of one of the first selectable visual option or the second selectable visual option;
   based on the user interface selection of one of the first selectable visual option or the second selectable visual option:
      modify the playing of the media asset to override the configuration to automatically play the next media asset; and
      modify the playing of the media asset to be based on the selection of one of the first selectable visual option or the second selectable visual option.

10. The system of claim 9, wherein the prompt comprises a thumbnail that matches metadata of the media asset and metadata of a user profile.

11. The system of claim 9, wherein the system is further configured, when receiving the user interface selection of the second selectable visual option, to skip to the post-credits content the system is configured to play the post-credits content immediately.

12. The system of claim 11, wherein the system further configured to play a secondary post-credits content subsequent to the post-credits content.

13. A system comprising:
control circuitry configured to:
   play, by a media application, a media asset, wherein the media application is configured to automatically play a next media asset after beginning of a credits content of the media asset;
   in response to (a) determining that the media asset comprises a post-credits content and (b) that metadata of the post-credits content matches content of a user profile:
      modify the playing of the media asset to override the configuration to automatically play the next media asset;
      generate for display a plurality of selectable visual options;
      based on a user interface selection of a selectable visual option of the plurality of selectable visual options, modify the playing of the media asset to perform one of:
         (a) automatically continue to play the credits content and the post-credits content; or
         (b) automatically skip the credits content to play the post-credits content.

14. The system of claim 13, wherein the system is configured, when modifying the playing of the media asset, to further:
   determine post-credits content selection behavior;
   based on the determined post-credits content selection behavior, select one of:
      (a) automatically continuing to play the credits content and the post-credits content; or
      (b) automatically skipping the credits content to play the post-credits content.

15. The system of claim 13, wherein the system is further configured, when modifying the playing of the media asset, to:
   prior to the playing of the media asset, receive a user interface selection for preferred configuration of modification of the playing of the media asset and a plurality of other media assets, wherein the preferred configuration of modification includes selection of one of:
      (a) automatically continuing to play the credits content and the post-credits content; or
      (b) automatically skipping the credits content to play the post-credits content.

* * * * *